United States Patent
Bonnet et al.

(10) Patent No.: US 10,782,202 B2
(45) Date of Patent: Sep. 22, 2020

(54) LOAD MOMENT INDICATOR SYSTEM AND METHOD

(71) Applicant: Brandt Equipment Solutions Ltd., Regina (CA)

(72) Inventors: Dan Bonnet, Regina (CA); Mitch Stilborn, Regina (CA); Chris Semple, Regina (CA); Daniel Klassen, Regina (CA)

(73) Assignee: Brandt Industries Canada Ltd., Regina (CA)

( * ) Notice: Subject to any disclaimer, the term of this patent is extended or adjusted under 35 U.S.C. 154(b) by 0 days.

(21) Appl. No.: 15/815,892

(22) Filed: Nov. 17, 2017

(65) Prior Publication Data

US 2019/0033158 A1    Jan. 31, 2019

Related U.S. Application Data

(60) Provisional application No. 62/538,966, filed on Jul. 31, 2017.

(30) Foreign Application Priority Data

Jul. 28, 2017   (CA) .................................... 2974819
Oct. 26, 2017   (CA) .................................... 2983837

(51) Int. Cl.
  *G01M 1/14*      (2006.01)
  *G01M 1/36*      (2006.01)
(Continued)

(52) U.S. Cl.
  CPC ............... *G01M 1/14* (2013.01); *B60K 35/00* (2013.01); *B60K 37/06* (2013.01); *B60P 1/04* (2013.01);
(Continued)

(58) Field of Classification Search
  CPC ........ G01M 1/14; G01M 17/00; B60K 35/00; B60K 2350/10; B60P 1/04; B66C 23/44;
(Continued)

(56) References Cited

U.S. PATENT DOCUMENTS 3,534,355 A   10/1970   Fathauer
3,641,551 A    2/1972   Sterner et al.
(Continued)

OTHER PUBLICATIONS

Canadian Office Action dated Jul. 22, 2019 for Application No. CA 2,983,837, 4 pgs.
(Continued)

*Primary Examiner* — Marthe Y Marc-Coleman
(74) *Attorney, Agent, or Firm* — Frost Brown Todd LLC

(57) ABSTRACT

A method for determining stability of a vehicle having a load suspended from the vehicle is provided. The method can include obtaining measurements from a plurality of sensors positioned on the vehicle, obtaining a measurement from a vehicle accelerometer operative to determine an inclination of the vehicle, determining a position of the load suspended from the vehicle, determining a slung load of the load suspended from the vehicle, using the determined slung load and the determined position of the load suspended from the vehicle, determining tipping moments acting on the vehicle, determining righting moments acting on the vehicle and determining a tipping stability based on the determined tipping moments and determined righting moments.

66 Claims, 23 Drawing Sheets

(51) Int. Cl.

| | |
|---|---|
| *E02F 9/20* | (2006.01) |
| *B66C 23/76* | (2006.01) |
| *E02F 9/26* | (2006.01) |
| *B60K 37/06* | (2006.01) |
| *B60K 35/00* | (2006.01) |
| *B66C 23/44* | (2006.01) |
| *B66F 17/00* | (2006.01) |
| *E02F 3/58* | (2006.01) |
| *B66C 23/90* | (2006.01) |
| *F16L 1/06* | (2006.01) |
| *G01M 17/00* | (2006.01) |
| *G01L 5/00* | (2006.01) |
| *G01L 5/16* | (2020.01) |
| *G01P 15/08* | (2006.01) |
| *B60P 1/04* | (2006.01) |
| *E02F 3/52* | (2006.01) |
| *E02F 3/54* | (2006.01) |

(52) U.S. Cl.
CPC .............. *B66C 23/44* (2013.01); *B66C 23/76* (2013.01); *B66C 23/905* (2013.01); *B66F 17/003* (2013.01); *E02F 3/58* (2013.01); *E02F 9/2033* (2013.01); *E02F 9/264* (2013.01); *F16L 1/06* (2013.01); *G01L 5/0061* (2013.01); *G01L 5/16* (2013.01); *G01M 1/36* (2013.01); *G01M 17/00* (2013.01); *G01P 15/0802* (2013.01); *B60K 2370/168* (2019.05); *B60K 2370/172* (2019.05); *B60P 1/045* (2013.01); *E02F 3/52* (2013.01); *E02F 3/54* (2013.01)

(58) Field of Classification Search
CPC ........ B66C 23/905; B66F 17/003; E02F 3/58; F16L 1/06; G01L 5/0061; G01L 5/16; G01P 15/0802
USPC ....................................................... 701/124
See application file for complete search history.

(56) References Cited

U.S. PATENT DOCUMENTS

| | | |
|---|---|---|
| 3,724,679 A | 4/1973 | Brownell et al. |
| 4,334,217 A | 6/1982 | Nield et al. |
| 4,511,974 A | 4/1985 | Nakane et al. |
| 4,516,116 A | 5/1985 | White |
| 5,160,055 A | 11/1992 | Gray |
| 5,788,018 A | 8/1998 | Mendelsohn et al. |
| 5,992,655 A | 11/1999 | Greenberg et al. |
| 6,170,681 B1 | 1/2001 | Yoshimatsu |
| 6,536,615 B2 | 3/2003 | Nishikino et al. |
| 6,611,746 B1 | 8/2003 | Nagai |
| 7,683,564 B2 | 3/2010 | Harris et al. |
| 8,070,413 B2 | 12/2011 | Brooks et al. |
| 8,272,521 B1 | 9/2012 | Kemmerly et al. |
| 2005/0216116 A1 | 9/2005 | Nield |
| 2007/0289931 A1 | 12/2007 | Henriksson |
| 2008/0224111 A1 | 9/2008 | Urciuoli |
| 2010/0012610 A1* | 1/2010 | Rudy .................... B66C 23/905 212/270 |
| 2011/0024378 A1 | 2/2011 | Pleuss et al. |
| 2013/0043448 A1 | 2/2013 | Balder et al. |
| 2014/0019014 A1 | 1/2014 | Claxton |
| 2015/0176253 A1† | 6/2015 | Taylor |
| 2015/0344272 A1* | 12/2015 | Lin ......................... B66C 13/06 212/276 |
| 2016/0017573 A1* | 1/2016 | Colwell ................ E02F 9/2029 701/50 |
| 2016/0169413 A1* | 6/2016 | Camacho .................. F16L 1/06 701/50 |
| 2017/0050823 A1 | 2/2017 | Roodenburg et al. |
| 2017/0066631 A1 | 3/2017 | Mupende et al. |
| 2018/0282137 A1 | 10/2018 | Kaybidge |
| 2018/0339891 A1 | 11/2018 | Ijadi-Maghsoodi et al. |
| 2019/0062127 A1 | 2/2019 | Hesselbein |

OTHER PUBLICATIONS

R30(2) Examiner Requisition for Canadian Patent Application No. 2,983,837, 6 pages, published Nov. 19, 2018, published by Canadian Intellectual Property Office.†

\* cited by examiner
† cited by third party

LOAD MOMENT INDICATOR SYSTEM AND METHOD

CROSS-REFERENCE TO RELATED APPLICATIONS

This application claims priority to and benefit of CA Serial No. 2,974,819, filed Jul. 28, 2017; U.S. Provisional Application Ser. No. 62/538,966, filed Jul. 31, 2017 and CA Serial No. 2,983,837, filed Oct. 26, 2017, the contents of which are incorporated by reference in their entirety for all purposes.

FIELD OF THE INVENTION

The present invention relates to a load moment indicator method and system and more particularly a load moment indicator system and method that uses sensors provided on a body of a machine to determine the load forces.

BACKGROUND

Vehicles that carry loads can be subject to changing forces depending on the weight of the load that they are carrying and the position of the load relative to the vehicle. Additionally, many vehicles that's purpose is to lift a load are meant to lift the load from a first position off of the ground or other surface and move the suspended load to another position before placing it down. This moving of the load will cause the moments acting on the vehicle as a result of the load to change as the load is moved between positions. These loads can seriously affect the stability of the vehicle carrying the load and in cases where the stability is affected enough, the vehicle can tip as a result of the forces applied to the vehicle by the load.

The tipping of the vehicle can be caused by the weight of the load being too great, the load being unbalanced, a combination of the load being too great and extended to far away from the main body of the vehicle, etc. Additionally, the risk of a vehicle tipping as a result of a load can be increased by the vehicle being positioned on or moving across a sloped ground surface. While the weight of the load and its position might not be a problem if the vehicle is provided on a level ground surface, when the ground surface is sloped (including sloped in more than one direction) the slope of the ground surface can greatly affect the tipping moments that are created on the vehicle by the load. This can not only cause a load that would not cause an issue on level ground to put a vehicle in danger of tipping because of the sloped ground surface, but it can also greatly affect moments acting on the vehicle and the direction the moments are acting in.

In is very desirable for operators of these vehicle to know and understand how likely the vehicle is to tip with a specific load while they are operating the vehicle to avoid dangerous tipping situations; not only on a level ground surface but also when the vehicle is positioned on or moving across a sloping ground surface.

BRIEF SUMMARY

In a first aspect, a method for determining stability of a vehicle having a load suspended from the vehicle is provided. The method can include obtaining measurements from a plurality of sensors positioned on the vehicle, obtaining a measurement from a vehicle accelerometer operative to determine an inclination of the vehicle, determining a position of the load suspended from the vehicle, determining a slung load of the load suspended from the vehicle, using the determined slung load and the determined position of the load suspended from the vehicle, determining tipping moments acting on the vehicle, determining righting moments acting on the vehicle and determining a tipping stability based on the determined tipping moments and determined righting moments.

In another aspect, a controller for determining stability of a vehicle having a load suspended from the vehicle. The controller can include at least one processing unit, an input interface operatively connectable to a plurality of sensors provided on the vehicle and a vehicle accelerometer operative to determine an inclination of the vehicle and at least one memory containing program instructions. The at least one processing unit can be responsive to the program instructions and operative to: obtain measurements from the plurality of sensors positioned on the vehicle; obtain a measurement from the vehicle accelerometer operative to determine an inclination of the vehicle; determine a position of the load suspended from the vehicle; determine a slung load of the load suspended from the vehicle; using the determined slung load and the determined position of the load suspended from the vehicle, determining tipping moments acting on the vehicle; determining righting moments acting on the vehicle; and determining a tipping stability based on the determined tipping moments and determined righting moments.

In another aspect, a pipelayer machine is provided. The pipelayer machine can include a main body, a side boom pivotally connected to the main body, a boom winch connected to the boom by a boom cable, a luff block attached to the main body near the boom winch and the boom cable running through the luff block, a hook winch, and a sensor array. A sensor array can include a load pin pivotally connecting the luff block to the main body of the pipelifter machine, a luff accelerometer positioned on a luff block and operative to measure a position of the luff block, a boom winch encoder operative to measure the direction of the boom winch and used to more accurately determine the position of the luff accelerometer and a vehicle accelerometer operative to measure the inclination of the vehicle.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
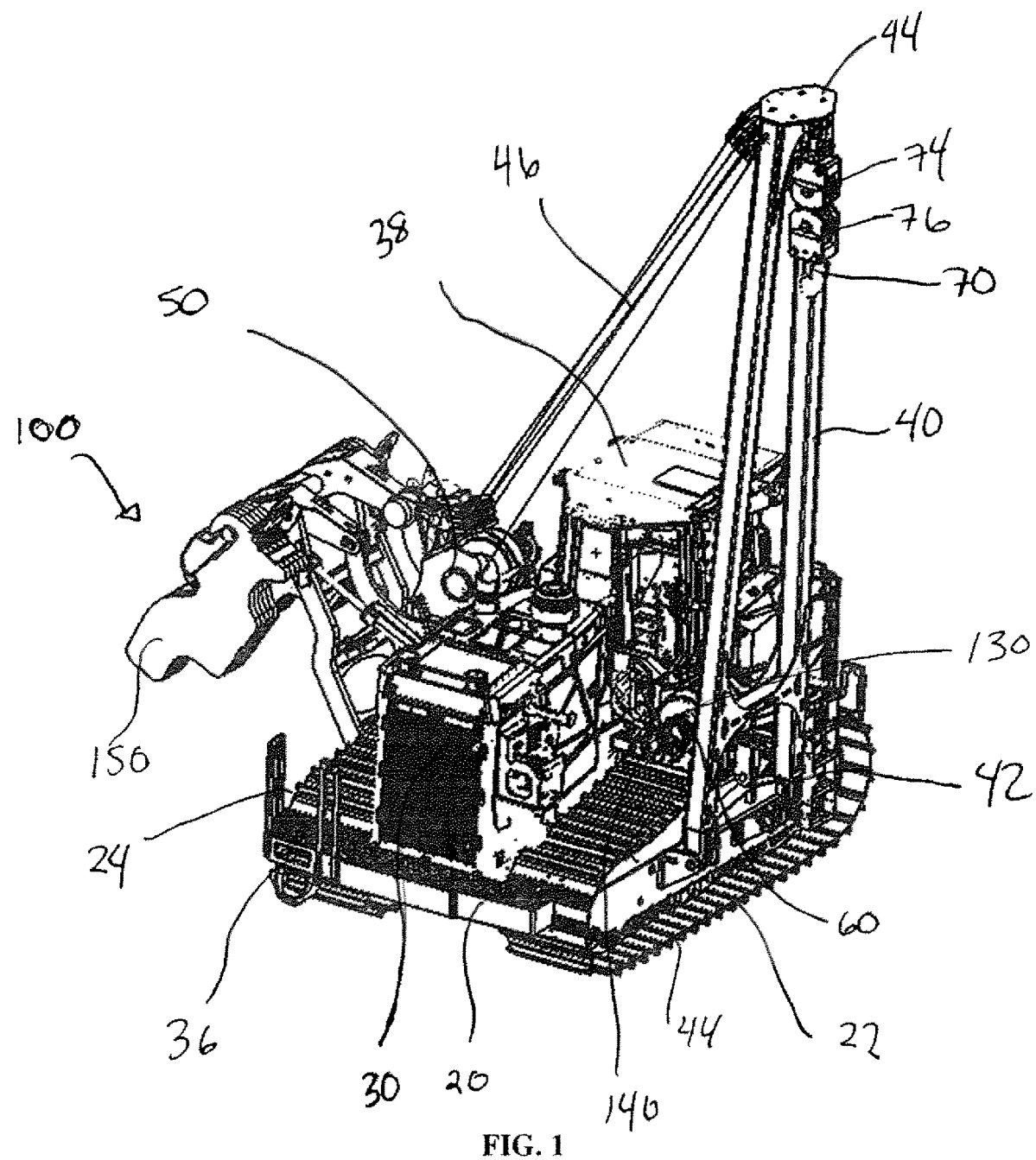
FIG. 1 is a perspective view of a pipelayer machine.

FIG. 1 illustrates a pipelayer machine 10 for placing sections of pipe section in a trench. The pipelayer machine 10 can include a main body 20, an engine 30, a first side track 34, a second side track 36, a cab 38, a side boom 40, a counterweight assembly 100, a boom winch 50, a hook winch 60 and a hook 70.

The main body 20 can have a first side 22 and a second side 24 and hold the engine 30 and the pair of tracks 34, 36. The cab 38 is provided for an operator to sit and control the operation of the pipelayer machine 10.

The side boom 40 is used to support a pipe section that is lifted off of the ground by the pipelayer machine 10 and to move the pipe section laterally away from the pipelayer machine 10 over top of the trench so that the pipe section can be lowered by the pipelayer machine 10 into the trench. The side boom 40 can be pivotally connected at a proximal end 42 of the side boom 40 to a first side 22 of the main body 20 of the pipelayer machine 10 so that the side boom 40 extends laterally from the first side 22 of the main body 20. In one aspect, the proximal end 42 of the side boom 40 can be connected inside the first side track 34 on the first side 22 of the main body 20 so that the first side track 34 rotates around the proximal end 42 of the side boom 40.

In one aspect, the side boom 40 can have a triangular frame.

The boom winch 50 can be used to raise and lower the side boom 50. The boom winch 50 can be operatively attached to a distal end 44 of the boom 40 by a boom cable 46. The boom winch 50 can be attached to the main body 20 of the pipelayer machine 10 so that the boom cable 46 passes between the boom winch 50 and the distal end 44 of the side boom 40 in front of the cab 38 of the pipelayer machine 10.

The boom winch 50 can be wound to raise the boom 40 around its pivotally connected proximal end 42 or unwound to lower the boom 40 around the pivotally connected proximal end 42.

Figure 2:
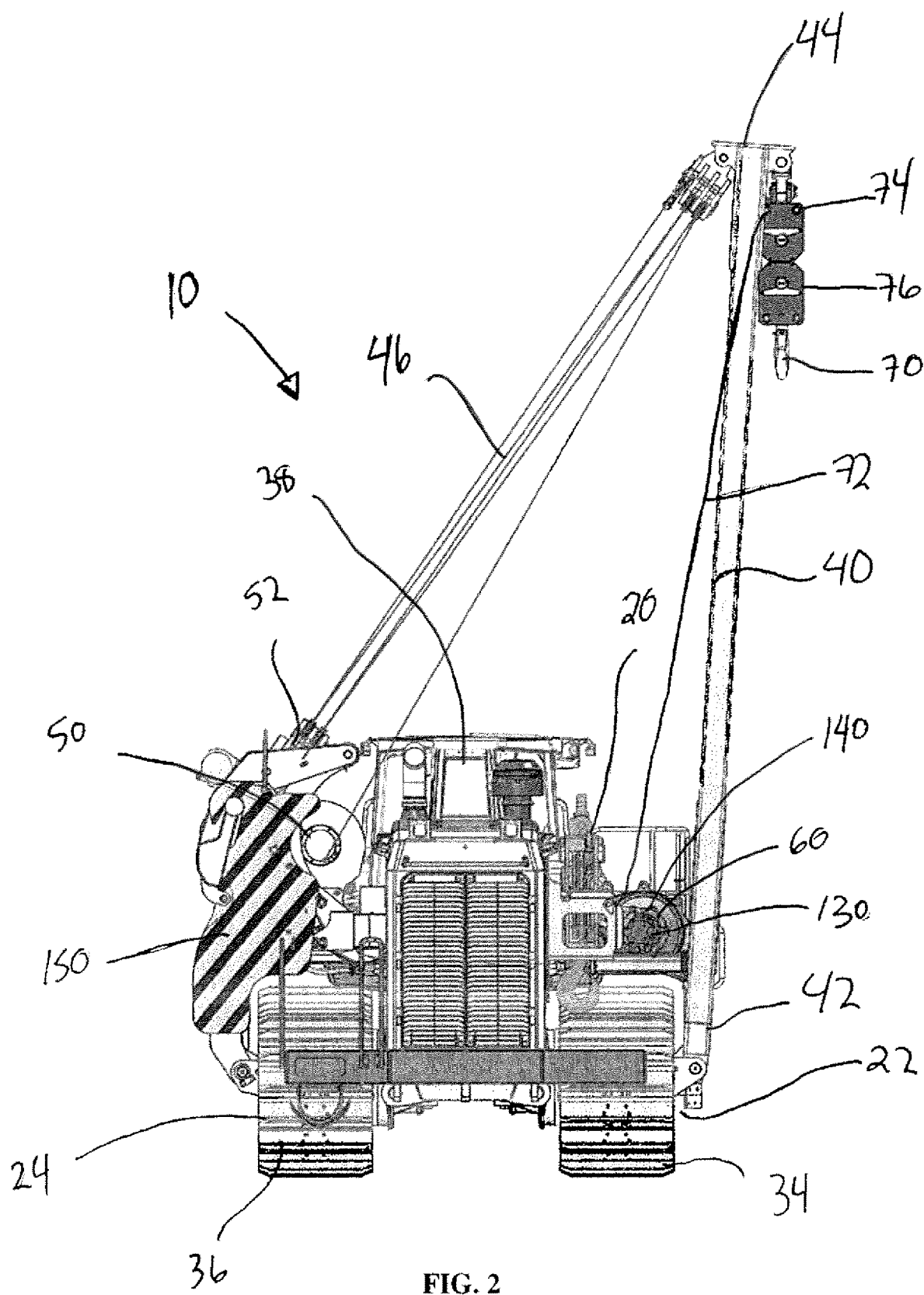
FIG. 2 is a front view of the pipelayer machine of FIG. 1.

The boom cable 46 can be used in conjunction with a block and tackle assembly to increase the force applied to the boom 40 by the boom winch 50 to aid the boom winch 50 in raising the boom 40. Referring to FIG. 2, a luff block 52 can be pivotally attached to the main body 20 of the pipelayer machine 10, typically near the boom winch 50. The luff block 52 can pivot up and down at a pivot point where it is connected to the main body 20 of the pipelayer machine 10. A boom block 54 can be provided pivotally attached to the distal end 44 of the boom 40 by a boom block pin 45 so that the boom block 44 can pivot upwards and downwards around the boom block pin 45. The boom cable 46 can run back and forth between the luff block 52 and the boom block 54 to form a block and tackle system that multiplies the force that the boom winch 50 is applying to the distal end 44 of the boom 40. In the embodiment shown in FIGS. 2 and 3, the boom cable 46 runs back and forth between the luff block 52 and the boom block 54 four (4) times, but it could be run fewer or more times depending on the number of pulleys provided in each of the blocks.

The hook winch 60 and hook 70 can be used to raise and lower a pipe section. The hook winch 60 can be connected to the hook 70 with a hook cable 72 and the hook winch 60 can be wound to raise the hook 70 and thereby any pipe section attached to the hook 70 or unwound to lower the hook 70.

Typically, the hook cable 72 is used with a block and tackle assembly to increase the force the hook winch 60 can apply to the load attached to the hook 70. With the hook cable 72 connected to a load block 74 connected to a distal end 44 of the boom 40 and a hook block 76 that the hook 70 is provided on.

Referring again to FIG. 1, the counterweight assembly 100 is connected to the second side 24 of the main body 20 on an opposite side of the main body 20 from the first side 22. The counterweight assembly 100 is used to counterbalance the forces applied to the pipelayer machine 10 created when the pipelayer machine 10 lifts a pipe section off of the ground and moves it outwards laterally from the pipelayer machine 10 using the boom 40 to position the pipe section over a trench. The counter weight assembly 100 uses counterweights 150 and can move these counterweights 150 laterally away from the second side 24 of the main body 20 of the pipelayer machine 10 before the pipe section is picked up and moved laterally away from the first side 22 of the main body 20 of the pipelayer machine 10.

Figure 4:
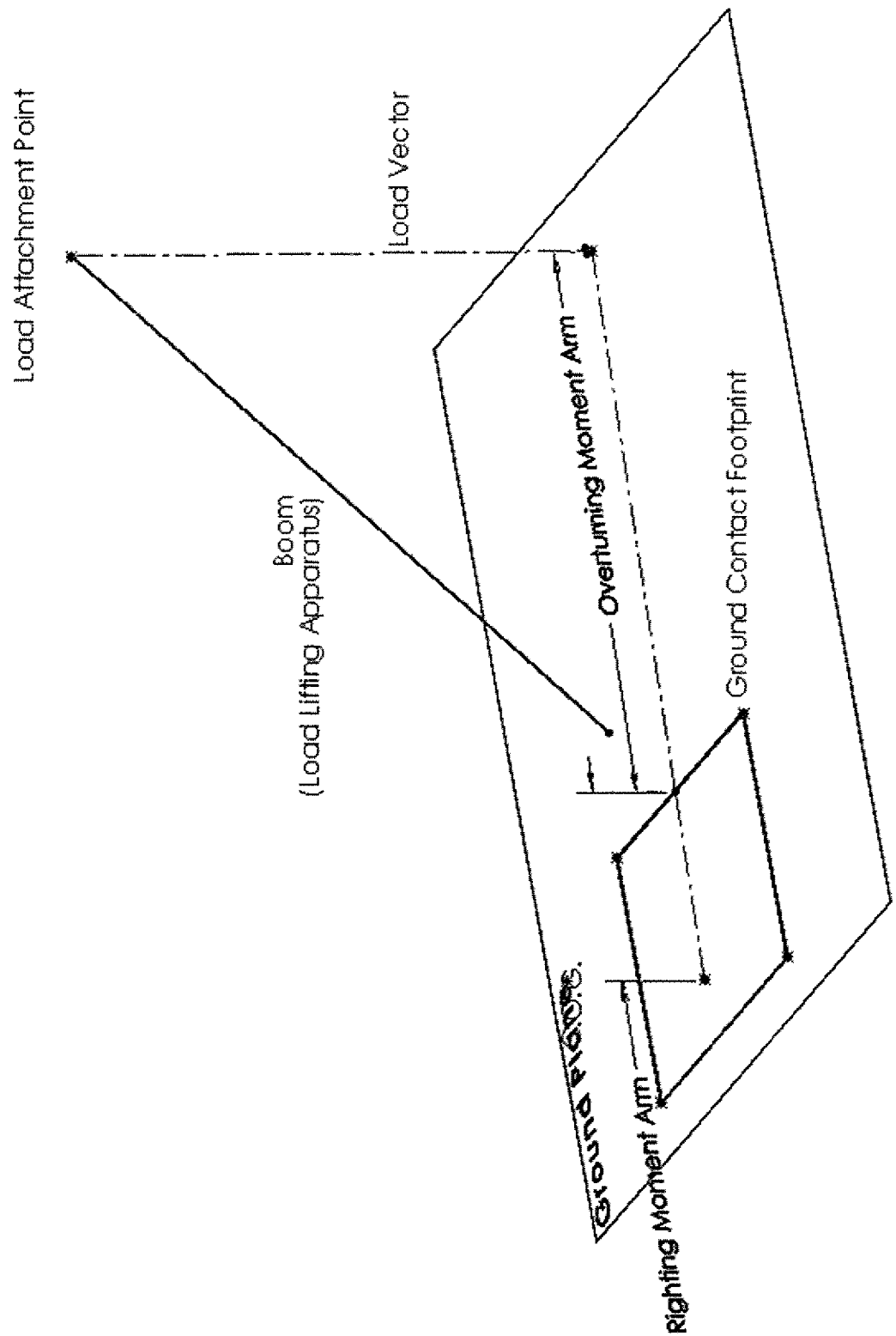
FIG. 4 is a three-dimensional schematic force diagram of the tipping mechanics of a pipelayer machine or other vehicle having a boom with a load suspended from the boom where the vehicle is provided on level ground.
Figure 5:
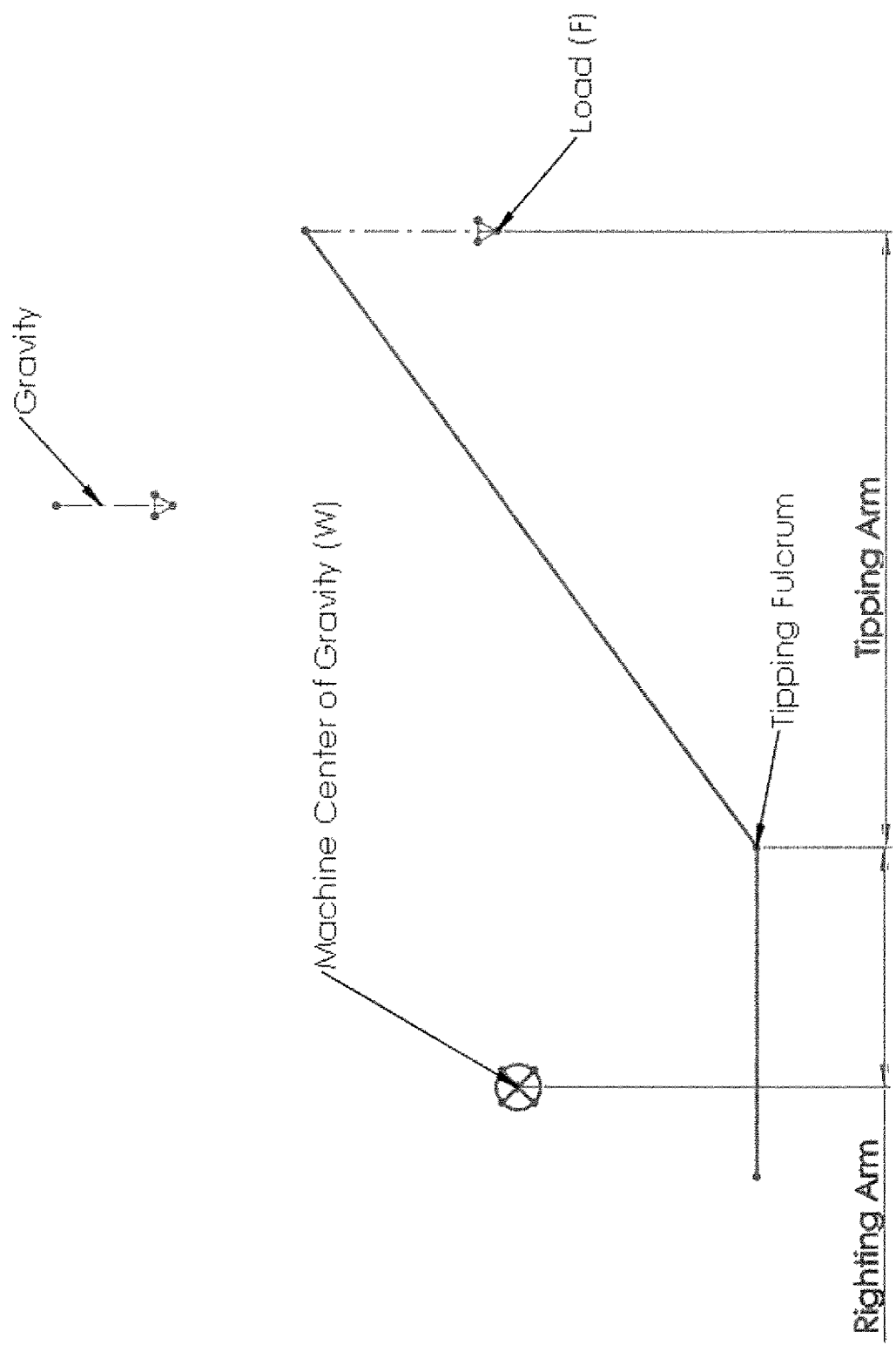
FIG. 5 is a two-dimensional image of the three-dimensional force diagram shown in FIG. 4.

FIG. 4 illustrates the forces and moments the pipelayer machine 10 is subjected to by the load suspended from the boom 40 and FIG. 5 illustrates a 2-dimensional view of forces shown in FIG. 4. A tipping moment acting on the pipelayer machine 10 is created by a load being suspended from the boom 40 of the piperlayer machine 10 using the hook 70. If this tipping moment is large enough, the tipping moment can tip the pipelayer machine 10 over by pivoting it around a tipping fulcrum. The tipping fulcrum is typically the outside edge of the first track 34 on the first side 22 of the main body 20 of the pipelayer machine 10 because if the load suspended from the boom 40 is too heavy or too far away from the pipelayer machine 10 and tips the pipelayer machine 10 over, this outside edge of the first side track 34 will remain in contact with the ground while the second side track 36 of the pipelayer machine 10 will lift off of the ground surface and the entire pipelayer machine 10 will pivot around the tipping fulcrum.

A righting moment acts in an opposite direction to the tipping moment and resists the tipping force caused by the weight of the boom and the load suspended from the boom 40. This righting moment can be determined by the moment created around the fulcrum point by the weight of the pipelayer machine 10 minus the moment created around the tipping fulcrum by the weight of the boom 40 (since this moment will act in an opposite direction as the weight of the pipelayer machine 10). The righting moment is therefore determined using the weight of the pipelayer machine 10 and the horizontal distance between where the center of gravity of the pipelayer machine 10 is acting on the ground surface and the tipping fulcrum of the pipelayer machine 10 minus the weight of the boom 40 and the horizontal distance between the center of gravity of the boom 40 and the tipping fulcrum of the pipelayer machine 10.

The use of the counterweight assembly 100 and extending the counterweight assembly 100 laterally outwards from the second side 24 of the main body 20 of the pipelayer machine 10 will increase the center of gravity over towards the second side 24 of the main body 20 of the pipelayer machine 20, thereby increasing the distance between the center of gravity of the pipelayer machine 10 and the tipping fulcrum, which in turn increase the righting moment. This is why the counterweight assembly 100 is extended outwards before a load is picked up and suspended from the boom 40.

As long as the righting moment is greater than the tipping moment, the load suspended from the boom 40 will not cause the pipelayer machine 10 to tip over. However, the closer the tipping moment gets to the righting moment, the more in danger the pipelayer machine 10 is of tipping until the tipping moment matches and then exceeds the righting moment. When the tipping moment exceeds the righting moment, the pipelayer machine 10 will tip over.

Figure 6:
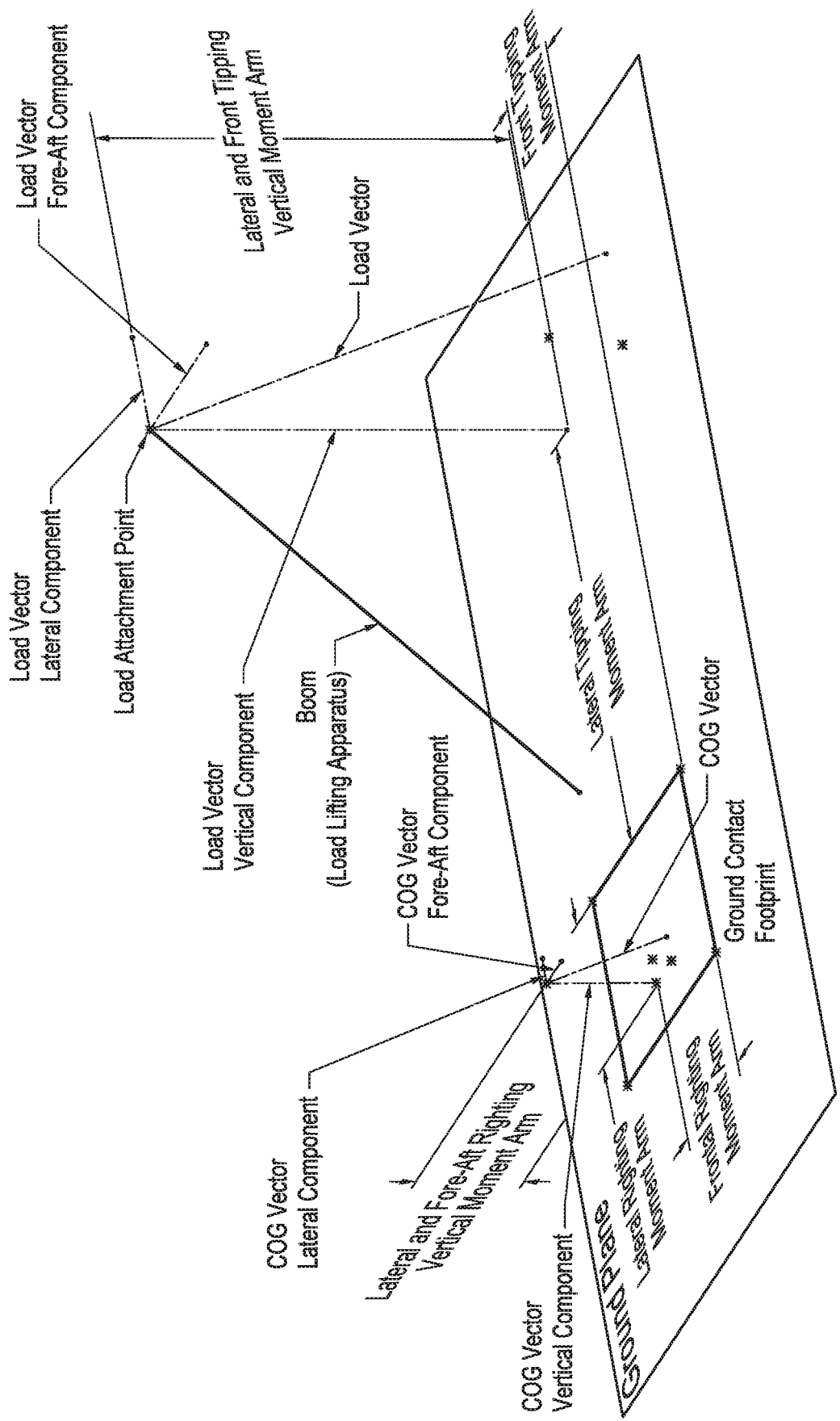
FIG. 6 is a schematic force diagram of the tipping mechanics of a pipelayer machine or other vehicle having a boom with a load suspended from the boom where the vehicle is provided on a ground surface with a compound slope.
Figure 9:
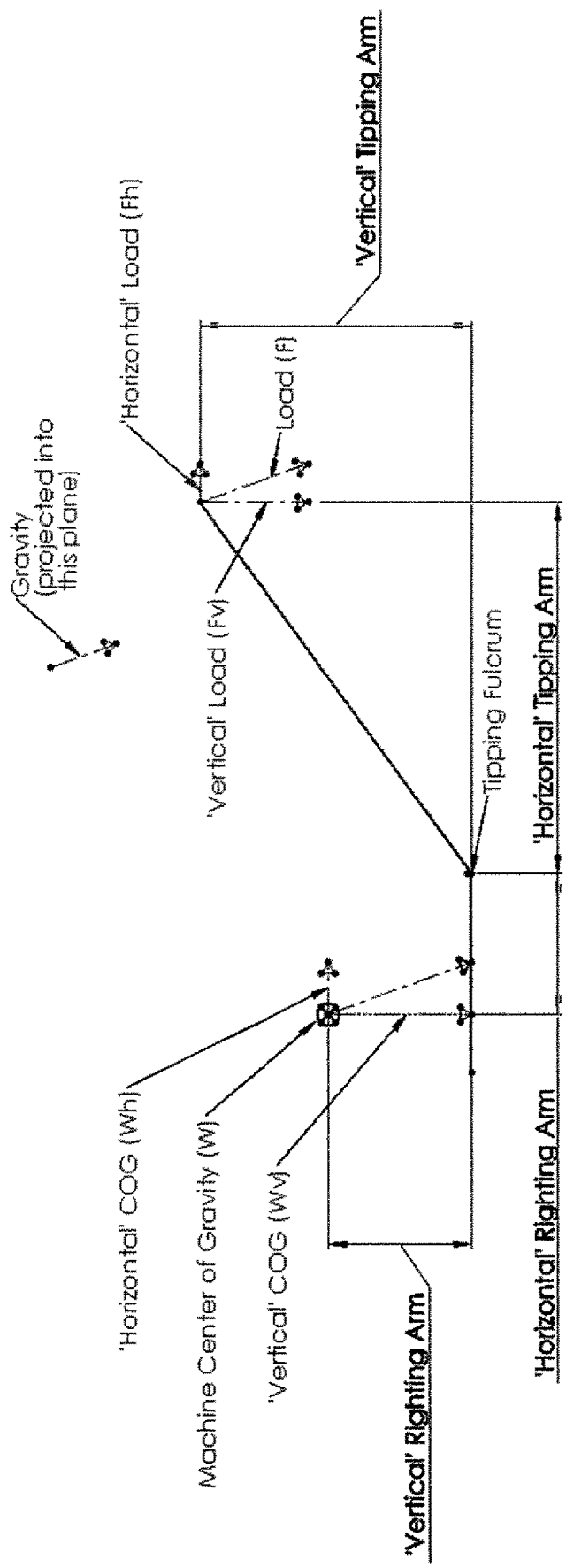
FIG. 9 is a two-dimensional image of the three-dimensional force diagram shown in FIG. 6.

FIG. 4 shows a fairly straightforward set of forces because the pipelayer machine 10 or other vehicle with a boom is provided on level ground, since gravity is parallel with the machine's vertical axis, the righting moment is simply calculated from the righting force multiplied by the righting arm and the tipping moment is simply calculated from the tipping force multiplied by the tipping arm. This generalized arrangement applies to lateral or fore-aft tipping mechanics. However, if the pipelayer machine 10 or other vehicle is on a ground surface with an incline or compound incline, the forces do not act directly vertically downwards with respect to the machine's vertical axis and instead the direction of the forces and their various vertical and horizontal components become more complicated. FIG. 6 shows the forces acting on the pipelayer machine 10 or other vehicle with a boom when the vehicle is on a ground surface with compound slopes (in this case sloped both laterally and fore-aft) and FIG. 9 is a two-dimensional representation of this situation. Since gravity is not parallel with any of the machine's principal axes, the righting and tipping moments must be calculated using the components of their force vectors and moment arm vectors that are projected upon the machine's principal planes. The righting moment is calculated from multiplying the 'vertical' CG force by the 'horizontal' righting moment arm, multiplying the 'horizontal' CG force by the 'vertical' righting moment arm and summing them into a net righting torque. The tipping moment is calculated from multiplying the 'vertical' tipping force by the 'horizontal' tipping moment arm, multiplying the 'horizontal' tipping force by the 'vertical' tipping moment arm and summing them into a net tipping torque. This generalized arrangement applies to lateral or fore-aft tipping mechanics.

Operators should and want to know how close the pipelayer machine 10 is to tipping or what the "tipping stability" of the pipelayer machine 10 is while it is in use. The tipping stability of the pipelayer machine 10 is an indication of the propensity of the pipelayer machine to tip and can be expressed in many ways. One way of expressing this tipping stability is through use of a tipping factor (or percent tipping), which is a numerical expression of the tipping stability. In one aspect, a tipping factor having a value less than 1 or 100% represents that the machine has not tipped, a value of 1 or 100% represents that the machine has reached its exact tipping point, and a value greater than 1 or 100% represents that the machine is tipping over. This tipping factor can be the tipping moment created by the load being lifted by the pipelayer machine 10 divided by the righting moment which is the moment created by the weight of the pipelayer machine with the moment created by the boom of the weight subtracted from it. This can be expressed in numerous ways, including as follows:

$$TippingFactor = \frac{TippingMoment}{PipelayerWeightMoment - BoomWeightMoment}$$

Or as follows:

$$TippingFactor = \frac{TippingMoment + BoomWeightMoment}{PipelayerWeightMoment}$$

Or as follows:

$$TippingFactor = \frac{CoGDistanceToTippingFulcrum@CurrentSlope}{CoGDistanceToTippingFulcrum@ZeroSlope}$$

Or as follows:

$$TippingFactor = \frac{CurrentSlope}{CalculatedTippingSlope}$$

Or as follows:

$$TippingFactor = 1 - \frac{RightingMoment@CurrentSlope}{RightingMoment@ZeroSlope}$$

A sensor array can be provided on the pipelayer machine 10 for determining the tipping stability of the pipelayer machine 10 in real-time. The sensor array uses sensors that are all provided on the main body 20 of the pipelayer machine 10 instead of providing them on the boom 10. In this manner, these sensors are less likely to get damaged during removal, transport and reinstallation of the boom 40.

Since the boom 40 is typically removed from the pipelayer machine 10 after the pipe layer machine 10 is done installing pipe sections in a trench so that the pipelayer machine 10 and boom 40 can be transported to the next work site as separate pieces, the boom 40 can be jarred and jostled around quite often. This can make the sensors positioned on the boom 40 more likely to be damaged, especially since the sensors are relatively fragile compared to the boom itself. By having the sensors on the main body 20 of the pipelayer machine 10, it also makes it easier to run wires to the sensors since the sensors are all on the main body 20, instead of if sensors were mounted on the boom 40 which require wires to be run the length of the boom 40 and be provided across pivoting and moving connections. Wireless systems that mount the components on the boom 40 can be prone to operational failures due to lack of signal connectivity between sending and receiving units. However, by placing the sensors on the main body 20 of the pipelayer machine 10, it is more difficult to obtain position information about the boom 40 and weight measurements of the load because this information is not being directly measured by the sensors as it likely would be if the sensors were provided on the boom 40. Instead, the sensors on the main body 20 of the pipelayer machine 10 are measuring information that is only correlated to the position of the boom 40 and the weight of the load that is being suspended from the boom 40 and the measurements taken by these sensors must then be used to determine the position of the boom 40 and the weight of the load being suspended from the boom 40.

Figure 3:
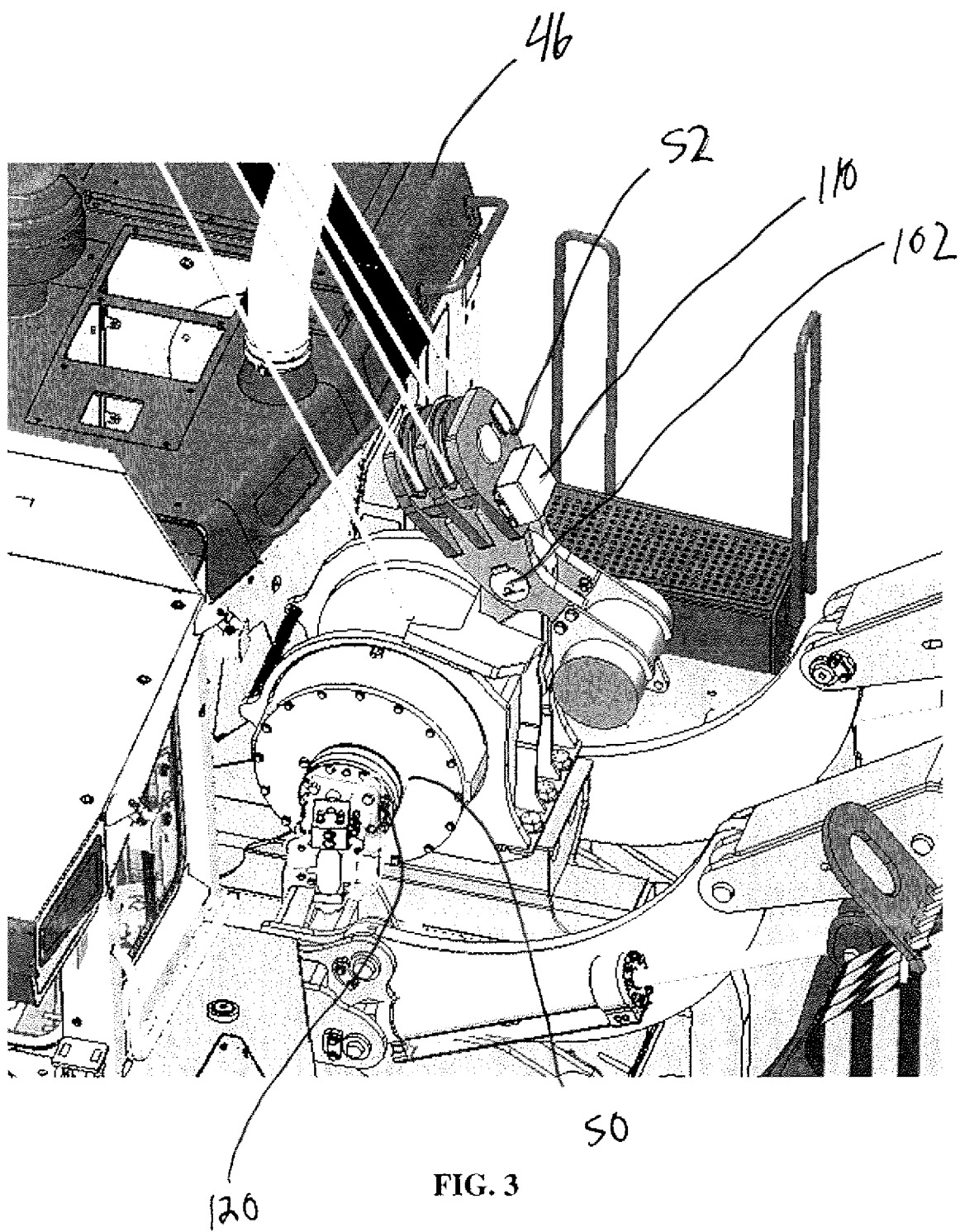
FIG. 3 is a close up view of a boom winch and luff block on the pipelayer machine of FIG. 1.

Referring to FIG. 3, the sensor array can include a load pin 102, a luff accelerometer 110, and a boom winch encoder 120. Additionally, a vehicle accelerometer 130 can be provided on the main body 20 of the pipelayer machine 10 and a hook winch encoder 140 can be provided on the hook winch 60.

The load pin 102 can be used to pivotally connect the luff block 52 to the main body 20 of the pipelayer machine 10 and to determine the force being applied to the luff block 52 by the boom cable 46. This force measured by the load pin 102 can indicate the force being applied to the distal end 44 of the boom 40 by the boom cable 46 running between the luff block 52 and the boom block 54.

The luff accelerometer 110 can be positioned on the luff block 52 and used to measure the position of the luff block 52 and in particular the angle of the luff block 52. This angle of the luff block 52 can indicate approximately the angle of the boom cable 46 running between the luff block 52 and the boom block 54.

The boom winch encoder 120 can be used to more accurately approximate an angle of an imaginary line running between the load pin 102 where the luff block 52 is pivotally connected to the main body 20 of the pipelayer machine 10 and the distal end 44 of the boom 40. Although the luff accelerometer 110 can measure the angle of the luff block 52, because of friction between the luff block 52 and the load pin 102, slack in the boom cable 46 as it runs between the luff block 52 and the boom block 54, etc. the luff block 52 does not always point directly at the distal end 44 of the boom 40. Instead, the angle of the luff block 52 can tend to lag behind the angle of an imaginary line passing between the load pin 102 and the distal end 44 of the boom 40 when the boom 40 is being raised and therefore the luff accelerometer 110 will tend to indicate an angle that is slightly less than the actual angle when the boom 40 is being raised. Additionally, the pivoting of the luff block 52 will also lag when the boom 40 is being lowered so that the angle of the luff block 52 being measured by the luff accelerator 110 will tend to be measured as greater than the angle of an imaginary line passing between the load pin 102 and the distal end 44 of the boom 40. The boom winch encoder 120 can be used to adjust the angle of the luff block 52 determined by the luff accelerometer 110. When the boom winch encoder 120 determines that the boom winch 59 is winding and therefore raising the boom 40, the angle measured by the luff accelerometer 110 can be adjusted by adding an amount to the measured angle to accommodate for the luff block 52 angle lagging and not pointing directly at the distal end 44 of the boom 40. This can allow a more accurate approximation of an angle to the distal end 44 of the boom 40. Conversely, when the boom winch encoder 120 determines that the boom winch is unwinding and therefore lowering the boom 40, the angle measured by the luff accelerometer 110 can be adjusted by subtracting an amount from the measured angle to adjust the measured angle and get a more accurate approximation of the angle to the distal end 44 of the boom 40. More complex luff block 52 behavior can be accounted for as well, such as how it behaves during a change in direction from lowering to raising the boom 40 or vice versa.

The vehicle accelerometer 130 can be used to determine the angle of incline of the pipelayer machine 10 side-to-side, front-to-back or a combination of these slopes. For example, if the pipelayer machine 10 is positioned on flat ground then the lateral incline angle of the pipelayer machine 10 is 0 and the weight of the pipelayer machine 10 will act directly downwards from the center of gravity of the pipelayer machine 10 onto the ground surface supporting the pipelayer machine 10. However, if the pipelayer machine 10 is on a lateral sloping ground surface, depending which way the pipelayer machine 10 is inclined, the incline of the pipelayer machine 10 can either cause the righting moment to be greater than it would be if the pipelayer machine 10 was on flat ground while the tipping moment is less or conversely can cause the righting moment to be less than it would if the pipelayer machine 10 was on level ground while the tipping moment is greater. The lateral incline of the pipelayer machine 10 will also affect the position of the distal end 44 of the boom 40, because if the pipelayer machine 10 is tilted, the distal end 44 of the boom 100 is in a different position than it would be in if the pipelayer machine 10 was on level ground.

The front-to-back incline of the pipelayer machine 10 similarly affects the righting moment and the tipping moment. Most tipping factors account only for tipping about the first track 34 of the pipelayer machine 10, however the use of the sensor array allows the calculation of frontwards and rearwards tipping factors which describe the likelihood of the pipelayer machine 10 to tip over about a tipping fulcrum located at either the front or rear edge of the first track 34 where they contact the ground, respectively.

The hook winch encoder 140 can be positioned on the hook winch 60 to determine the direction of rotation of the hook winch 60 and the distance the hook block 76 has travelled and the direction it is travelling.

To determine the tipping stability of the pipelayer machine 10, the sensor array can be used to measure a number of forces and positions and then this information can be used to determine the position of the distal end 44 of the boom 40, which in turn can be used to determine the slung load (the weight of the load suspended from the boom 40). With the slung load and the position of the distal end 44 of the boom 40 determined, the tipping moment acting on the pipelayer machine 10 and the counteracting righting moment can be determined and used to determine the tipping stability or "tipping factor" of the pipelayer machine 10.

While the preceding is applicable to a sensor array in one aspect for placement and configuration of a number of sensors on a pipelayer machine 10 sensors, can also be placed on a number of other machines that carry loads to measure and determine the force of these loads.

Figure 10:
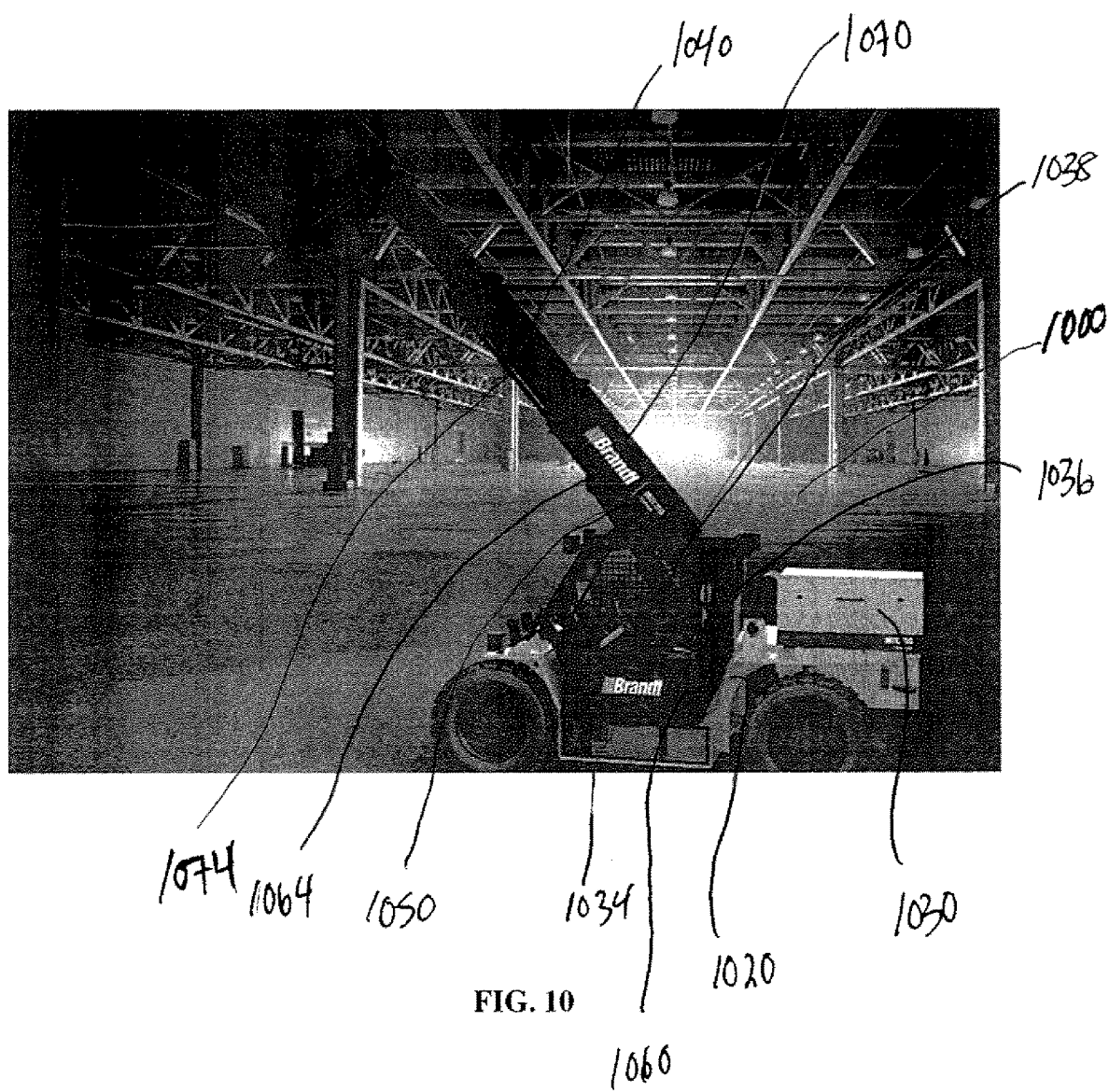
FIG. 10 is a photograph of a telehandler having an array of sensors attached that can be used to determine a tipping stability of the telehandler.

FIG. 10 shows a mobile crane or telehandler 1000. The telehandler 1000 can have a main body 1020, an engine 1030, a first side 1034, a second side 1036, a cab 1038, a boom 1040, a boom lift cylinder 1050, and a boom attachment 1052.

The boom 1040 can be positioned extending in front of the telehandler 1000 and the boom 1040 can be lifted or lowered using the boom lift cylinder 1050. The boom 1040 can also be extended or retracted to shorten or lengthen the boom 1040 as desired.

The boom 1040 can be attached to the telehandler 1000 at a proximal end of the boom 1040 and the boom attachment 1070 can be attached at a distal and of the boom 1040.

Sensors can be provided on the telehandler 1000 for determining the load being supported by the boom 1040 and any inclination of the telehandler 1000. These sensors can include: a vehicle accelerometer 1060; a load pin 1064; a boom accelerometer 1070 and a boom length sensor 1074.

The vehicle accelerometer 1060 can be provided on the main body 1020 to measure any inclination of the telehandler 1000.

The load pin 1064 can be provided connecting one end of the boom lift cylinder 1050 to either the boom 1040 or the main body 1020 of the telehandler 1000 to measure the force the boom lift cylinder 1050 is applying to the boom 1040.

The boom accelerometer 1070 can be positioned on the boom 1040 to determine the angle the boom 1040 is at. Alternatively, a boom lift cylinder length sensor can be used to determine how much the boom lift cylinder 1050 is extended and thereby used to determine the position of the boom 1040.

The boom length sensor 1074 can be any suitable sensor for determining the length of the boom 1040 at a current extension/retraction such as LVDTs, lasers, string-pots, etc. The boom length sensor 1074 can be mounted along or inside the boom 1040 to measure the extension of the boom 1040.

Figure 11:
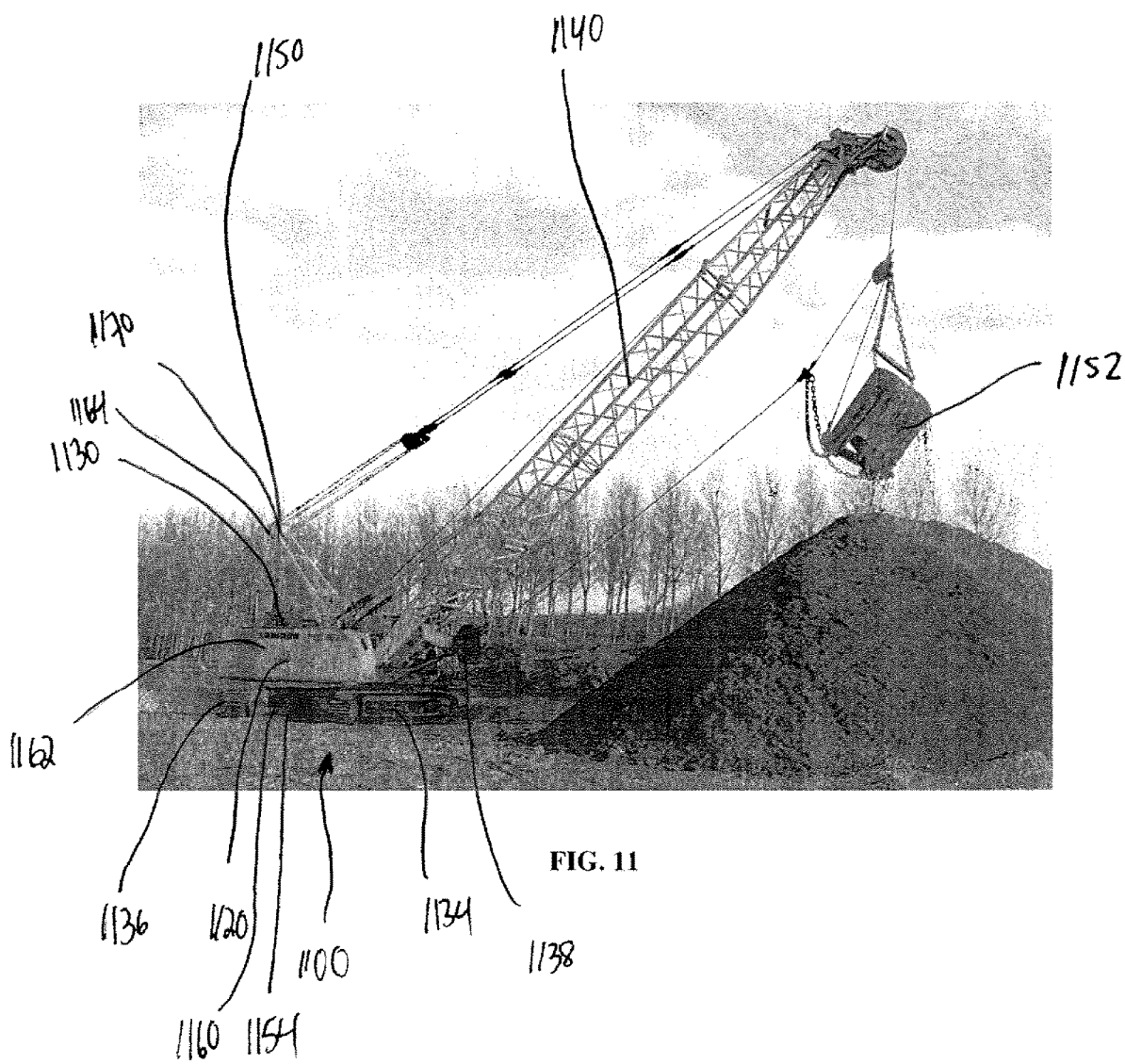
FIG. 11 is a photograph of a dragline boom having an array of sensors attached that can be used to determine a tipping stability of the dragline boom.

FIG. 11 shows a dragline excavator 1100. The dragline excavator 1100 can have a main body 1120, an engine 1130, a first side track 1134, a second side track 1136, a cab 1138, a boom 1140, a boom winch 1150, a bucket 1152, a track assembly 1154 and a vehicle rotation joint 1156 allowing the main body 1120 to pivot relative to the track assembly 1154.

The boom 1140 can be positioned extending in front of the dragline excavator 1100 and the boom 1140 can be lifted or lowered using the boom winch 1150 and a boom cable. The boom 1140 can be attached to the dragline excavator 1100 at a proximal end of the boom 1140. The bucket 1152 can be suspended by a cable from the distal end of the boom 1140.

Sensors can be provided on the dragline excavator 1100 for determining the load being supported by the boom 1140 and any inclination of the dragline excavator 1100. These sensors can include: a first vehicle accelerometer 1160; a second vehicle accelerometer 1062; a boom accelerometer 1170; and a load pin 1164.

The first vehicle accelerometer 1160 can be mounted on the dragline excavator 1100 below the vehicle rotation joint 1156 and, optionally, the second vehicle accelerometer 1162 can be mounted on the dragline excavator 1100 above the vehicle rotation joint 1156.

The boom accelerator 1170 can be positioned on the boom winch 1150 drum mount or the boom 1140 to obtain information about the position of the boom 1140.

The load pin 1164 can be mounted with boom winch 1150 drum mount or in the boom-support cylinder mounts to take measurements of information that can be used to determine the load being suspended from the distal end of the boom 1140.

Figure 12:
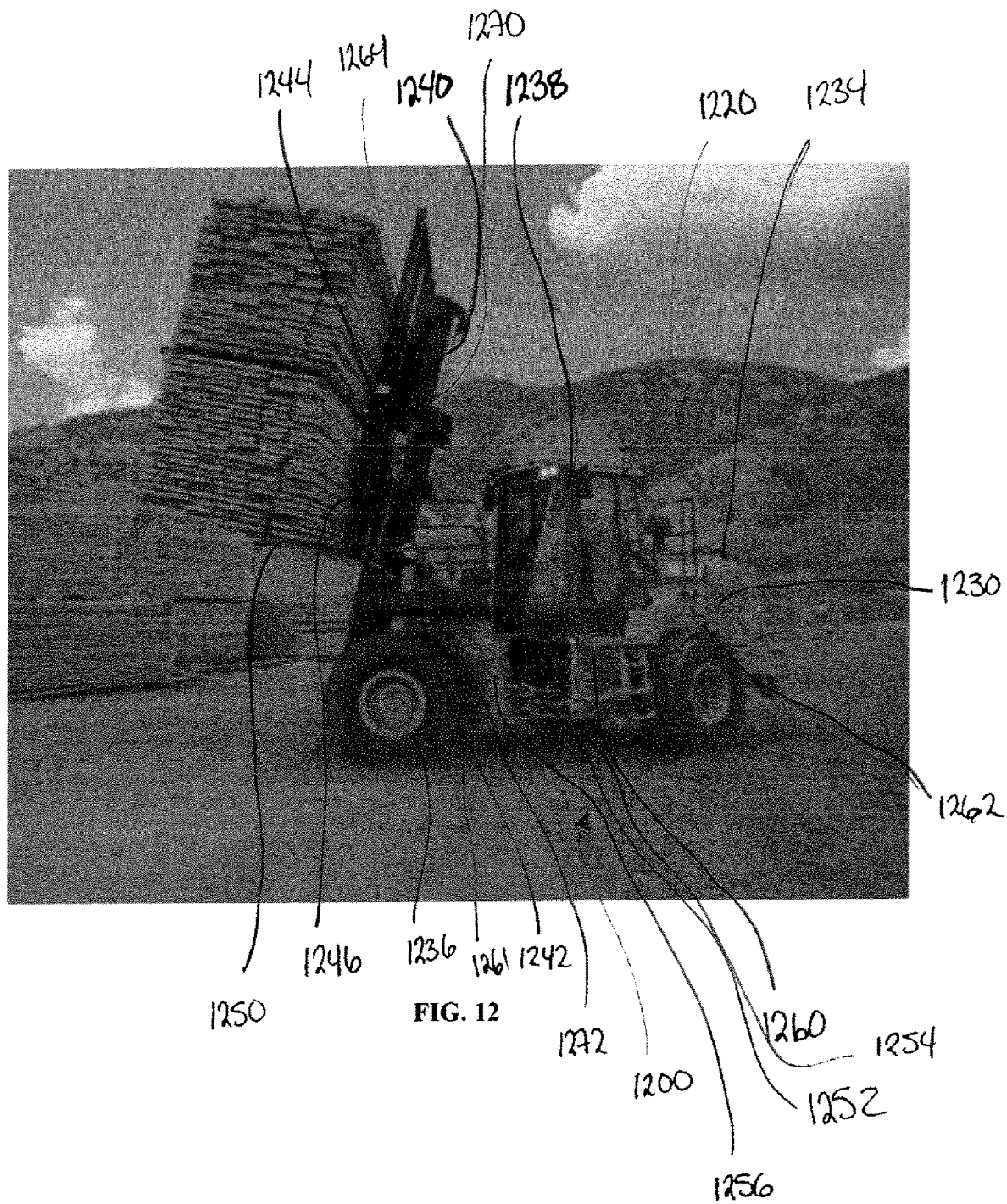
FIG. 12 is a photograph of an articulating forklift having an array of sensors attached that can be used to determine a tipping stability of the forklift.

FIG. 12 shows an articulating forklift 1200. The forklift 1200 can have a main body 1220, an engine 1230, a first side 1234, a second side 1236, a cab 1238, a mast 1240, a mast tilt cylinder 1242, a mast lift cylinder 1244, a carriage 1246, an articulation joint 1252 and forks 1250.

The mast 1240 can positioned in front of the articulating forklift 1200 to move the carriage 1246 up and down relative to the mast 1240 and thereby the forks 1250 or other attachment connected to the carriage 1246. The mast tilt cylinder 1244 can be positioned between the main body 1220 of the forklift 1200 and the carriage 1246 to pivot the mast 1240 relative to the main body 1220 of the forklift 1200. The mast lift cylinder 1244 can be provided on the mast 1240 to move the carriage 1246 relative to the mast 1240.

Sensors can be provided on the articulating forklift 1200 for determining the load being supported by the mast 1240 and carriage 1246 and any inclination of the articulating forklift 1200. These sensors can include a vehicle accelerometer 1260, a mast accelerometer 1270 or optionally a mast tilt cylinder length sensor 1272, a load pin 1264, an articulation angle sensor 1252 or optionally an articulation cylinder length sensor 1254 and one or more mast length sensors 1274.

The vehicle accelerometer 1260 can be provided on the main body 1220 of the forklift 1250 to measure any inclination of the articulating forklift 1200.

The mast accelerometer 1270 can be mounted on the mast 1240 to determine information about the position of the mast 1240. Alternatively, a cylinder length measurement sensor can be provided on the mast tilt cylinder 1242 to measure the extension or retraction of the mast tilt cylinder 1242.

The load pin 1264 can be provided where the mast tilt cylinder 1242 is attached to either the main body 1220 or the mast 1240 to measure the force applied to the mast 1240 by the mast tilt cylinder 1242. Alternatively, the load pin 1264 can be connected to one of the attachment points of the mast lift cylinder 1244 to measure the force applied by the mast lift cylinder 1244 to the carriage 1246.

The articulation angle sensor 1252 can be provided on the articulating joint 1252 to measure the rotation of the articulation frames and thereby the angle of the rear vehicle section 1262 relative to the front vehicle section 1261. Alternatively, a length sensor can be provided on the articulation cylinder(s) to measure their stroke position and thereby use the geometry to determine the angle of the rear vehicle section 1262 relative to the front vehicle section 1261.

The one or more mast length sensors 1274 can be any suitable sensor for determining the position of the carriage 1246 relative to the mast 1240 such as LVDTs, lasers, string-pots, etc.

Figure 13:
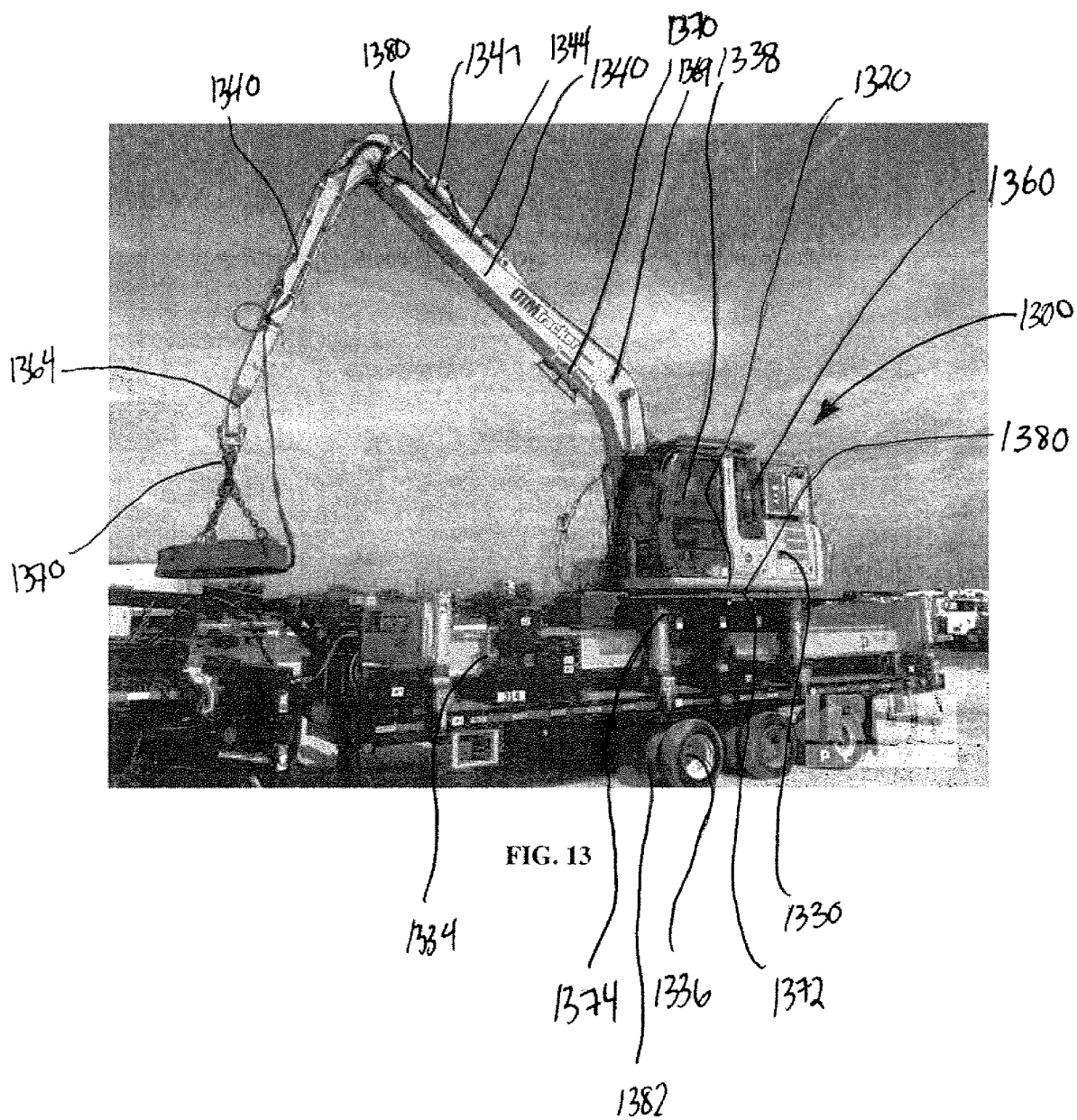
FIG. 13 is a photograph of a rail mounted crane having an array of sensors attached that can be used to determine a tipping stability of the rail mounted crane.

FIG. 13 shows a rail-mounted crane 1300. The rail-mounted crane 1300 can have a main body 1320, an engine 1330, first side wheels 1334, second side wheels 1336, a cab 1338, one or more boom sections 1340, one or more boom lift cylinders 1342, one or more boom lift cylinder length sensors 1344, a boom tip load attachment point 1370, a vehicle rotation joint 1372 allowing the main body 1320 to pivot relative to the wheel assembly 1374, and a vehicle rotation joint rotary position sensor 1380.

The boom 1340 can be rotated at any angle around the vehicle rotation joint 1372 and the boom 1340 can be lifted or lowered using the boom lift cylinder(s) 1342. The boom 1340 can also be pivoted in or out about the pivoting connection points between boom sections 1340 using intermediate boom lift cylinders 1342 which can act in concert to relatively lift or lower the boom distal end and move it closer or further from the vehicle main body 1320.

The boom 1340 can be attached to the rail crane 1300 at a proximal end of the boom 1340 and the load attachment 1370 can be located at a distal end of the boom 1340.

Sensors can be provided on the rail crane 1300 for determining the load being supported by the boom 1340, any inclination of the rail crane 1300, and the angular position of the main body 1320 with respect to the wheel assemblies. These sensors can include: a vehicle accelerometer 1360; a load pin 1364; boom accelerometers 1369; boom lift cylinder length sensors 1380; and a vehicle pivot rotation sensor 1382.

The vehicle accelerometer 1360 can be provided on the main body 1320 to measure any inclination of the rail crane 1300.

The load pin 1364 can be provided connecting one end of the boom lift cylinder 1342 to either the boom 1340 or the main body 1320 of the rail crane 1300 to measure the force the boom lift cylinder 1342 is applying to the boom 1340.

The boom accelerometer 1360 can be positioned on the boom sections 1340 to determine the angle of each boom section 1340. Alternatively, boom lift cylinder length sensors 1380 can be used to determine how much each boom lift cylinder 1342 is extended and thereby used to determine the position of the boom section 1340.

Figure 14:
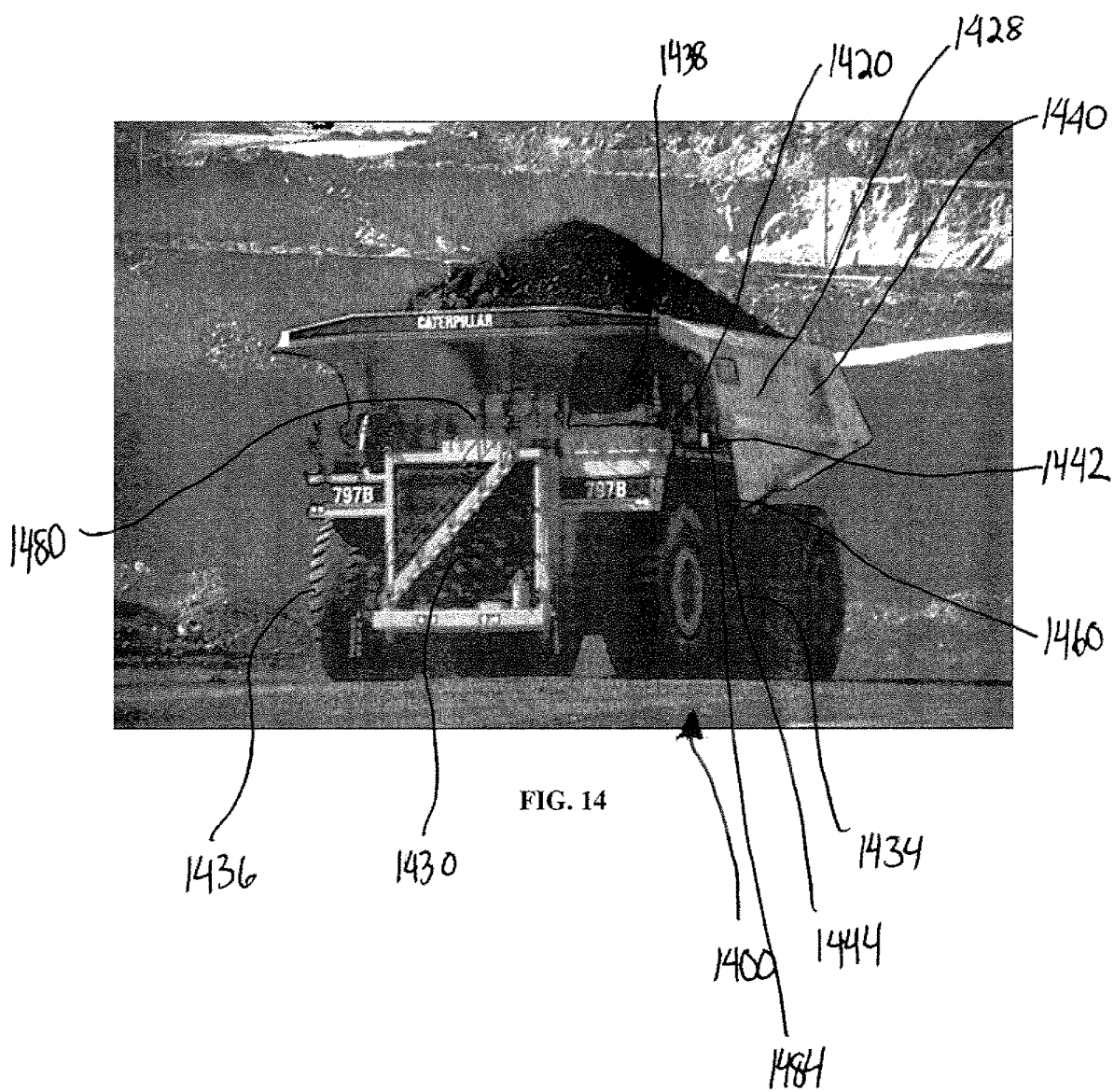
FIG. 14 is a photograph of a haul truck having an array of sensors attached that can be used to determine a tipping stability of the haul truck.

Referring to FIG. 14, a haul truck 1400 is shown. The haul truck 1400 can have a main body 1420, an engine 1430, a first side wheelset 1434, a second side wheelset 1436, a cab 1438, a dump box 1440, one or more dump box lift cylinders 1442, a dump box pivot point 1444, a dump box lift cylinder length sensor 1450, and a load pin 1460.

The dump box 1440 can be lifted by the dump box lift cylinder 1442 or lowered to its resting position. The dump box 1440 can be attached to the main body 1420 at one end with a dump box pivot pin 1444.

Sensors can be provided on the haul truck 1400 for determining the load being carried by the dump box 1440, any inclination of the haul truck 1400, and the position of the dump box 1440 with respect to the main body 1420. These sensors can include: a vehicle accelerometer 1480; a load pin 1460; a dump box accelerometer 1482; and dump box lift cylinder length sensors 1484.

The vehicle accelerometer 1480 can be provided on the main body 1420 to measure any inclination of the haul truck 1400.

The load pin 1460 can be provided connecting one end of the dump box lift cylinder 1484 to either the dump box 1440 or the main body 1420 of the haul truck 1400 to measure the force the dump box lift cylinder 1442 is applying to the dump box 1440.

The dump box accelerometer 1480 can be positioned on the dump box 1440 to determine the angle the dump box 1440 is at with respect to the vehicle main body 1420. Alternatively, a dump box lift cylinder length sensor 1450 can be used to determine how much the dump box lift cylinder 1442 is extended and thereby used to determine the position of the dump box 1440.

Figure 15:
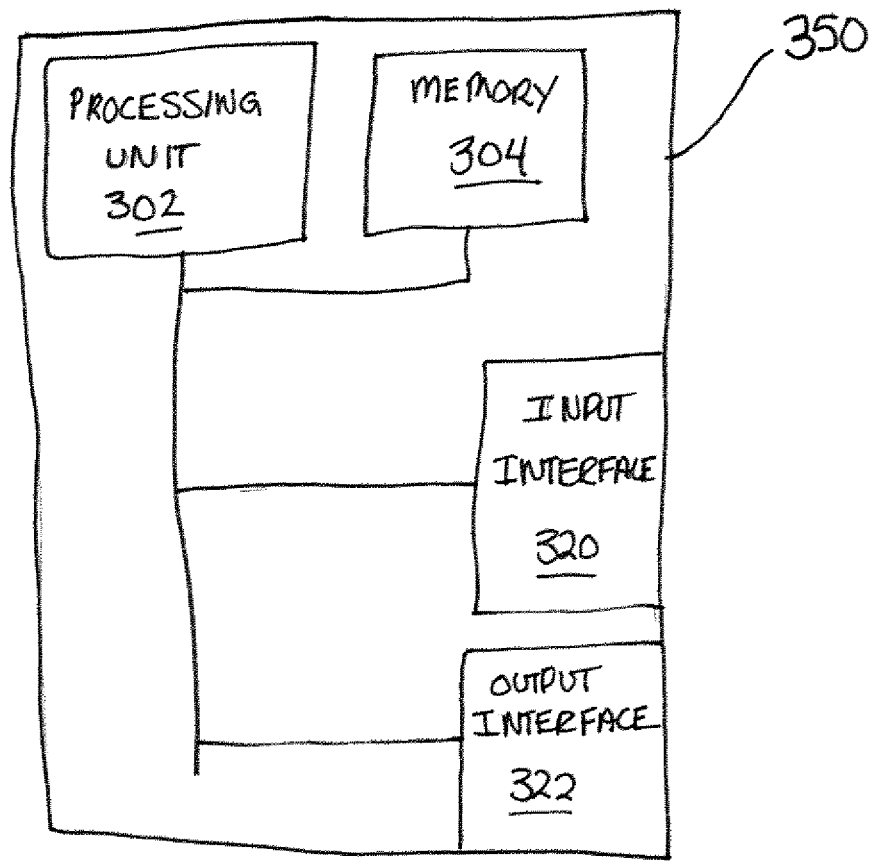
FIG. 15 is a schematic illustration of a controller.

FIG. 15 illustrates a controller 350 that can be used to obtain measurements from an array of sensors positioned on a vehicle and a vehicle accelerometer and then use these obtained measurements to determine the stability of the vehicle suspending a load. The controller 350 can be operably connected to one or more sensors that obtain position information related to the position of the load suspended from the vehicle and one or more sensors that obtain force information related to the slung load of the load suspended from the vehicle. The controller 350 can also be operably connected to a vehicle accelerometer on the vehicle that can determine an inclination of the vehicle. The controller 350 can be placed on the vehicle as well and can be used solely for obtaining these measurements and determining a tipping stability of the vehicle or it can be used to control a number of different functions of the vehicle, such as other systems, the engine, etc.

The controller 350 can include a processing unit 302, such a microprocessor that is operatively connected to a computer readable memory 304 and can control the operation of the controller 350. Program instructions for controlling the operation of the processing unit 302 can be stored in the memory 304 as well as any additional data needed for the operation of the controller 350. An input interface 320 can be provided operatively connected to the processing unit 302 so that the controller 350 can receive signals from sensors provided on the vehicle. The sensors obtaining position information about the position of the load and the sensors obtaining force information about the slung load of the load suspended from the vehicle can be connected to the input interface 320 to allow signals from these sensors to be transmitted to the controller 350. An output interface 322 can be provided operatively connected to the processing unit 302 to send signals to other devices such as a display screen.

Figure 16:
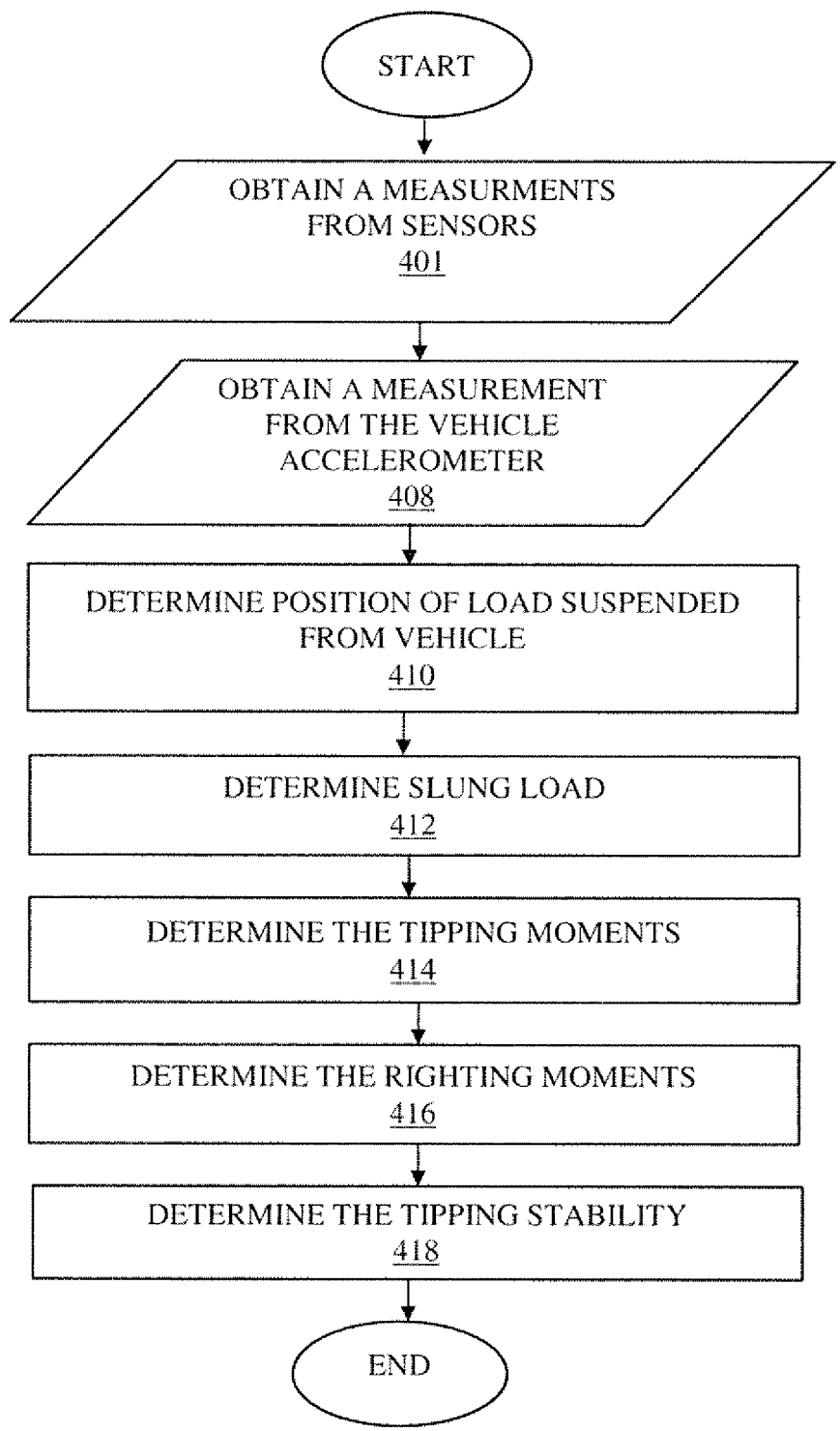
FIG. 16 is a flowchart of a method for determining a tipping stability of a vehicle.

FIG. 16 illustrates a flow chart of a method that can be performed by the controller 350 for determining the tipping stability of the vehicle carrying a load. The method can include the steps of: obtaining measurements from sensors 401; obtaining a measurement from the vehicle accelerometer 130 at step 408; determining a position of the suspended load being suspended by the vehicle at step 410; using the position of the suspended load from step 410, determining the slung load at step 412; using the determined slung load to determine the tipping moment at step 414; determining the righting moment at step 416; and determining a tipping factor at step 418.

Before the method is performed, pre-set machine information and parameters can be known to describe the vehicle's specification or current specification. This pre-set information can include the overall weight of the vehicle and/or weight of specific components, lengths and distances related to the vehicle and any other pre-defined information that might be necessary to perform the calculations and steps of the method. There may also be configurable parameters of the machine that are modified from time to time that may have to be entered in advance of the method to allow the method to be performed. These could be the weight of the vehicle, the location of the center of gravity of the vehicle, the vehicle width, the vehicle length, length of any boom, etc.

Figure 17:
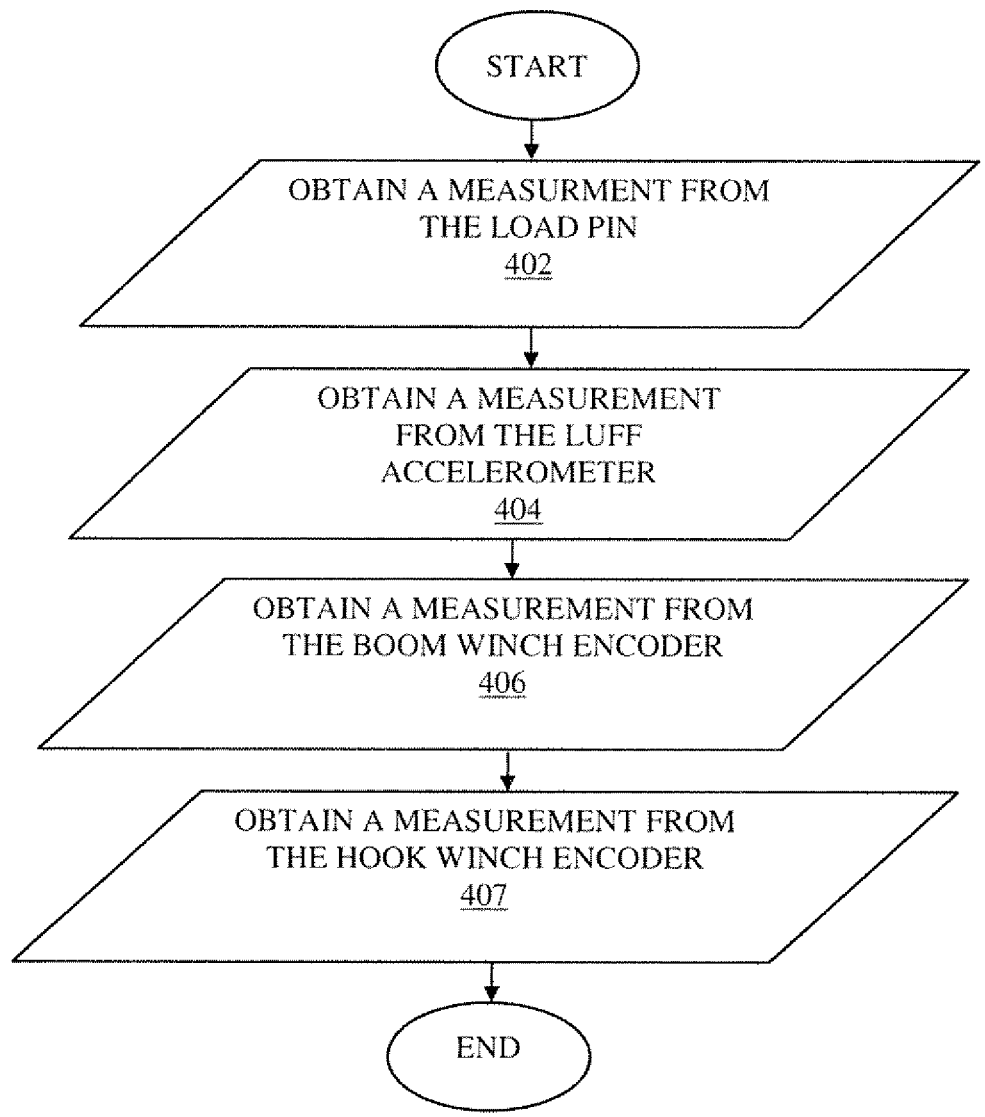
FIG. 17 is a flowchart of a method for obtaining sensors readings from a pipelayer machine.

If the vehicle is the pipelayer machine 10, the method can start at step 401 with sensor readings of positions and forces being obtained which will be used to determine a tipping stability for the vehicle. At step 401 a number of different measurements from different sensors are collected in order to obtain enough position and force information to determine the position of the distal end of a boom at step 410 and the weight of a load suspended from the boom (the slung load) at step 412. For example, if the vehicle is the pipelayer machine 10, step 401 of the method shown in flowchart can follow the method shown in FIG. 17 and include the steps of: obtaining a measurement from the load pin 102 at step 402; obtaining a position of the luff block 52 from the luff accelerometer 110 at step 404; obtaining a measurement from the boom winch encoder 120 at step 406; and obtaining a measurement from the hook winch encoder 140 at step 407.

At step 402 a force can be measured by the load pin 102. This force measured by the load pin 102 can indicate the force being applied to the distal end 44 of the boom 40 by the boom cable 46 running between the luff block 52 and the boom block 54.

At step 404, the luff accelerometer 110 can be used to obtain a position of the luff block 52 and more specifically an angle of the luff block 52 and at step 406 the boom winch encoder 120 can be used to more accurately determine the angle and position of the luff block 52. When the boom winch encoder 120 determines that the boom winch 50 is winding and therefore raising the boom 40, the angle measured by the luff accelerometer 110 can be adjusted by adding an amount to the measured angle to accommodate for the luff block 52 angle lagging and the luff block 52 not pointing directly at the distal end 44 of the boom 40. Conversely, when the boom winch encoder 120 determines that the boom winch is unwinding and therefore raising the boom 44, the angle measured by the luff accelerometer 110 can be adjusted by subtracting an amount to the measured angle to adjust the measured angle and get a more accurate approximation of the angle to the distal end 44 of the boom 40.

Optionally, at step 407, the hook winch encoder 140 can be used to determine if the hook winch 60 is winding or unwinding and this determination can be used to approximate the tension in the hook cable 73 and its effect on the load measured by the load pin 102.

Steps 402, 404, 406 and 407 do not need to be performed in the order shown in the flowchart in FIG. 16, but rather, can be performed in a different order or substantially simultaneously.

If the vehicle is a telehandler like the telehandler 1000 shown in FIG. 10, the method can start and at step 401 sensor readings of positions and forces can be obtained which will be used to determine a tipping stability for the telehandler 1000. These measurements can be position and force information to determine the position of the distal end of a boom 1040 of the telehandler 1000 for step 410 of the method, whether the telehandler 1000 has a fixed or varying length and the weight of a load (the slung load) suspended from the boom 1040 or supported by the boom attachment 1052 for step 412 of the method. For example, if the vehicle is a telehandler 1000, at step 401 a measurement can be obtained from the load pin 1064 to allow the weight being suspended or carried from the boom 1040 to be determined. The boom accelerometer 1070 can be used to obtain a measurement indicating the position of the boom 1040 and therefore the position of the distal end of the boom 1040 with a measurement obtained from the boom length sensor 1074. Alternatively, a boom lift cylinder length sensor can be used to obtain a measurement of how much the boom lift cylinder 1050 is extended thereby allowing the position of the boom 1040 to be determined and the position of the distal end of the boom 1040 with a measurement from the boom length sensor 1074.

If the vehicle is a dragline excavator 1100, the method can start at step 401 with sensors on the dragline excavator 110 taking measurements of positions and forces which can then be used to determine the tipping stability of the dragline excavator 1100. At step 401 a number of different measurements from different sensors are collected in order to obtain enough position and force information to determine the position of the distal end of a boom 1140 at step 410 and the weight of a load (the slung load) suspended from the boom 1140 at step 412. For example step 401 of the method can include the steps of: obtaining a measurement from the load pin 1164 to be used to determine the load suspended from the boom 1140; obtaining a position of the boom 1140 from the boom accelerometer 1170 to determine a position of the boom 1140 and therefore the position of the distal end of the boom 1140; and obtaining a measurement from the boom accelerometer 1160.

If the vehicle is a articulating forklift 1200, the method can start at step 401 with sensors on the articulating forklift 1200 taking measurements of positions and forces which can then be used to determine a tipping stability for the articulating forklift 1200. A number of different measurements can be obtained at step 401 from different sensors in order to obtain enough position and force information to determine the position of the position of the forks 1250 mounted on the carriage 1246 and the weight of a load (the slung load) suspended from or supported by the forks 1250 or other attachment. For example a measurement can be obtained from the load pin 1264 to measure a force used to determine the load suspended by the forklift 1200 and a measurement from the mast accelerometer and the mast length sensor 1274 to determine the position of the load suspended by the articulating forklift 1200. A measurement can be obtained from the articulation angle sensor 1252 or articulation cylinder length sensor(s) 1254 to determine an angle of the rear vehicle section 1262 relative to the front vehicle section 1261 to determine the location of the ground contact points.

If the vehicle is a rail mounted crane 1300, the method can start and at step 401 and sensor readings of positions and forces can be obtained which will be used to determine a tipping stability for the rail mounted crane 1300. At step 401 a number of different measurements from different sensors are collected in order to obtain enough position and force information to determine the position of the distal end of the boom sections 1340 at step 410 and the weight of a load (the slung load) suspended from the boom at step 412. For example if the vehicle is a rail mounted crane machine 1300, step 401 of the method can include the steps of: obtaining a measurement from the load pin 1364 at step 402 or optionally a measurement from the load attachment point load pin 1364; obtaining a position of the distal end of the boom sections 1340 from the boom accelerometer(s) 1369 or optionally the boom lift cylinder length sensor(s) 1380 and optionally the vehicle accelerometer 1360 mounted above the vehicle rotation joint 1372 and optionally the vehicle rotation joint rotary position sensor 1380.

If the vehicle is a haul truck 1400, the method can start at step 401 and sensor readings of positions and forces can be obtained which will be used to determine a tipping stability for the haul truck 1400. At step 401 a number of different measurements from different sensors are collected in order to obtain enough position and force information to optionally determine the position of the dump box 1440 at step 410 and the weight of a load contained within the dump box

1440 at step 412. For example if the vehicle is a haul truck machine 1400, step 401 of the method can include the steps of: obtaining a measurement of the position of the dump box 1440 from the dump box lift cylinder length measurement sensor 1484 or optionally obtaining a measurement from the dump box accelerometer 1482, obtaining a measurement of the haul truck 1400 attitude from the vehicle accelerometer 1480, and obtaining a measurement from the dump box 1440 weighing load pin 1460.

Referring again to FIG. 17, at step 408, a measurement can be obtained from the vehicle accelerometer 130 indicating the inclination of the vehicle and more specifically if the vehicle is on a level surface or whether it is inclined to one side or the other or if the front is higher or lower than the back and the angle of these inclines. This measurement can be expressed as a gravitational vector shown in FIGS. 5 and 9 indicating the direction gravity is acting on the vehicle and its load since gravity will not be acting directly vertically on the vehicle and the load if the vehicle is positioned on a ground surface with any sort of slope. The gravitational vector creates parallel vectors acting upon the vehicle's center of gravity and load which can also be seen in FIGS. 5 and 7.

The vehicle accelerometer 130 can be used to measure the angular difference between the gravity vector and the 'horizontal plane' of the machine's coordinate system. Overturning and righting forces are projected along this sensed vector to their intersection points with the vehicle's 'horizontal plane', thereby tracing a stability footprint. FIG. 4 shows a stability system for when the vehicle is positioned on level ground and FIG. 6 shows a vehicle on a ground surface that is sloped laterally and fore-aft. In FIG. 6 the righting moment and tipping moment arms are affected by the gravity vector having been modified because the vehicle is positioned on a sloped ground surface.

Steps 401 and 408 do not need to be performed in this order, but rather, can be performed in reverse order or substantially simultaneously.

In some cases, the sensors will obtain relatively direct information about the position of the weight of the slung load. For example, a load sensor can be positioned on a vehicle to measure the weight of the slung load suspended from the vehicle relatively directly, by placing a load pin sensor on a hook the slung load is suspended from, by measuring the force a cylinder applies to a boom or other lifting structure, etc. A telehandler 1000, forklift 1200, rail crane 1300 or other similar equipment may utilize a load pin mounted directly at or substantially close to the load application point, thereby measuring the slung load directly. Also, accelerometers may be placed on a vehicle to quite accurately measure the position of booms, etc. that provide a relatively direct measurement of the position of where the load is suspended from or the vehicle has a lifting structure that is relatively straightforward where a position measurement by an accelerometer can be easily used with simple geometry to determine a position where the load is suspended from. For example, the forklift 1200 and the haul truck 1400 might have sensors positioned where they are taking measurements that can be relatively easily translated into the slung load and the position of the vehicle where the load is suspended from.

In other cases, the sensors may be placed in locations on the vehicle where the measurements taken by these sensors are indirectly related to the slung load and the attachment point where the load is suspended from the vehicle and only implying the slung load and/or position of the vehicle where the load is suspended. In these cases, determining the position of the load suspended from the vehicle at step 410 and the slung load at step 412 can be more involved. These indirect force measurements could use a load pin or hydraulic pressures in the boom lift cylinders to measure the amount of load required to keep a boom on the vehicle from falling under its weight and the weight of the slung load, which when combined with knowledge of the position of the distal end of the boom as determined at step 410 and the attitude of the boom with respect to the machine coordinate system can be used to calculate the slung load that would require such an amount of force.

For example, if the method is being performed with the pipelayer vehicle 10, the load pin 102 will not directly provide the weight of the pipe section or other load (the "slung load") being lifted by the pipelifter machine 10 because some of the weight will be supported by the boom 40 and the weight of the boom 40 will also be increasing the load measured by the load pin 102. Therefore, the angle of the luff block 52 can be used to determine the position of the distal end 44 of the boom 40 at step 410 and then the position of the distal end 44 of the boom 40 can be used to determine the slung load of the pipe section or other load suspended from the boom 40 at step 412.

At step 410, the position of the load that is suspended from can be determined. This position determined for the load can be as simple as a distance from a tipping fulcrum of the vehicle to the load that can be used to calculate the tipping moment. However, in other aspects the position of the load can be a either a 2-dimensional location (which can then be used with the measurement obtained from the vehicle accelerometer to determine a 3-dimensional location of the load) or a 3-dimensional location. This position can vary depending on the type of vehicle. For example, if the vehicle is a pipelayer machine 10, the slung load can be the load suspended from the distal end 44 of the boom 40. If the vehicle is a telehandler 1000 the slung load will again be a load suspended from the distal end of the boom 104. If the vehicle is the articulating forklift 1200 the load will be suspended or carried by the forks 1250 or other assembly attached to the carriage 1246. If the vehicle is a haul truck 1400, the slung load will be contained within the dump box 1440.

Figure 18:
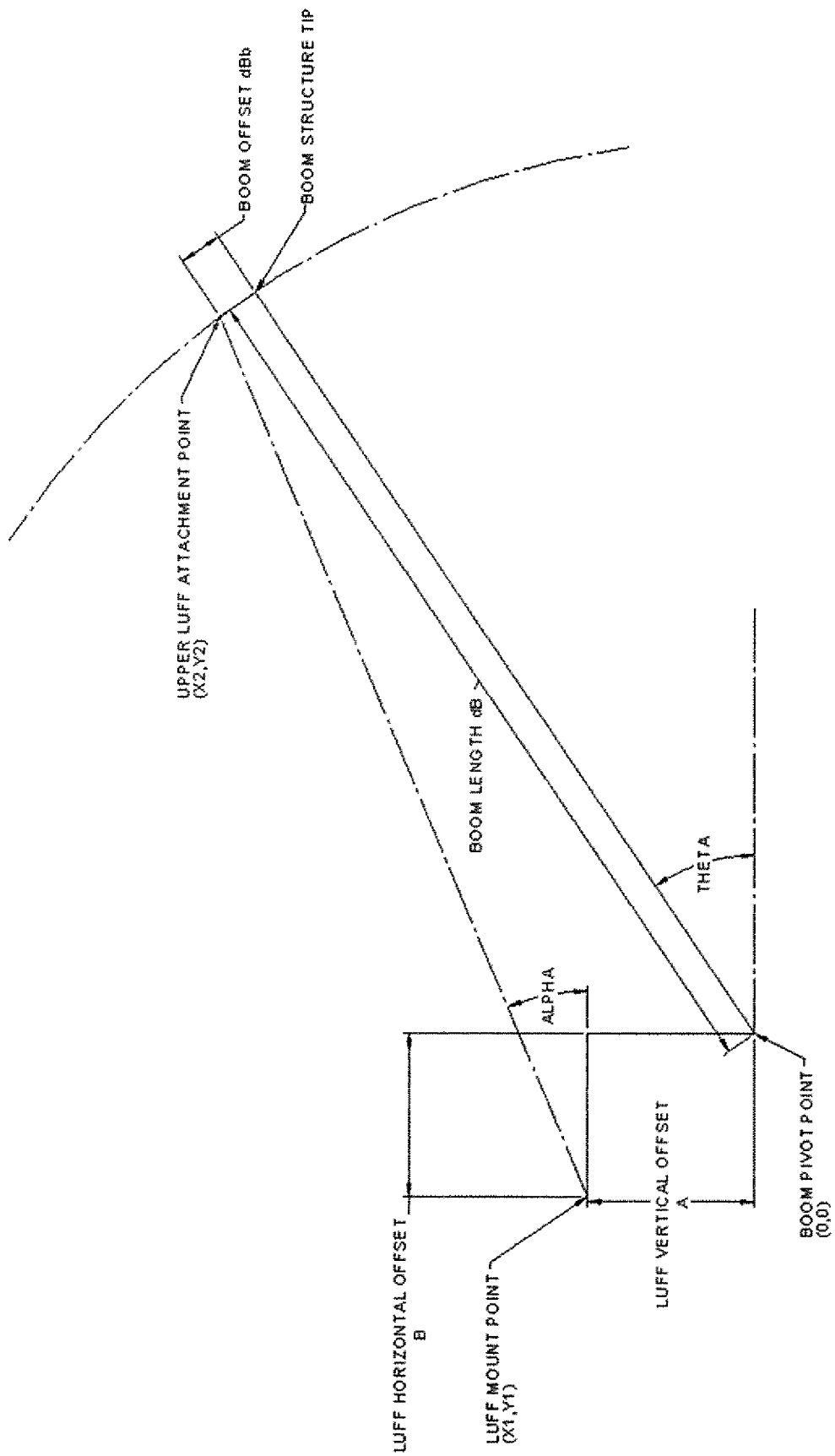
FIG. 18 is a schematic illustration of the relationship between a luff angle, α, a boom angle θ and the distal end of the boom of a vehicle with a boom such pipelayer device, dragline excavator or other similar lifting equipment.

If the vehicle is a pipelayer machine 10, the position of the distal end 44 of the boom 40 can be determined using the known information and measurements taken by the sensors using the relationship shown in FIG. 18. For vehicles such as the pipelayer machine 10, dragline excavator 1100 or other substantially similar equipment where it may not be possible or feasible to locate sensors directly on the boom 40, the distal end of the boom can be determined from sensors readings that are not directly placed on the boom. For the pipelayer machine 10, this can be determined based on the length of the boom 40, the location of the pivot point of the proximal end 42 of the boom 40, the location of the pivot point of the luff block 52 (the load pin 102), and the angle of the luff block 42 determined using the luff accelerometer 110 and the boom winch encoder 10 subtracted by the angle of incline of the pipelayer machine 10 measured by the vehicle accelerometer 130 (the ground slope).

The angle, $\alpha$, of the luff block 52 can be determined using the angle measured in step 404 and then altered using the measurement taken in step 406 and subtracting the angle (incline) of the pipelayer machine 110 determined using the vehicle accelerometer 140 (the ground slope). Subtracting the measurement of the vehicle accelerometer 140 from the measurement of the luff accelerometer 110 yields a measurement of the angular difference between the two accelerometers, thus giving a reading of the angle of the luff block 52 in the vehicle coordinate system.

Using the luff block angle, α, the position of the pivotal connection of the luff block 52 (load pin 102) and the position of the pivot point of the proximal end 42 of the boom 40, the position of the distal end 44 of the boom 40 can be determined using geometry. In one aspect, the arc that the distal end 44 of the boom 40 follows as it pivots can be determined, and the luff lock angle, α, can then be used to determine in which direction the boom cables 46 are extending, where the boom cables 46 intersect this radius can be determined, which will indicate where the distal end 44 of the boom 40 is located at that specific time.

The position of the distal end 44 of the boom 40 and the position of the proximal end 42 of the boom 40 can also then be used to determine the angle of the boom, θ, which will be the angle of the boom 40 and the vehicle coordinate system horizontal plane.

FIG. 18 shows a geometrical sketch describing the relationship between the luff angle Alpha (α) as measured by the luff accelerometer 110 and the boom angle Theta (θ), which is required to calculate the position of the distal end 44 of the boom 40. In one aspect, this relationship can be determined by considering that the possible locations of the point where the boom block 54 is attached to the distal end 44 of the boom 40 trace out an arc centered at the pivot point of the boom 40 at the proximal end 42 of the boom 40. There exists a line segment connecting the luff block 52 and the attachment point of the boom block 54 on the distal end 44 of the boom 40. With a line segment passing through the point (X1, Y1)=(-B, A) intersecting at point (X2, Y2) an arc of length dB and centered at (0,0), the angle θ of the boom 40 in regards to the pipelayer machine 10 coordinate system's horizontal plane is calculable using the following equation:

$$\theta = \cos^{-1}\left\{\frac{-[2\tan(\alpha)(A - B\tan(\alpha))] \pm \sqrt[2]{\begin{array}{c}[2\tan(\alpha)(A - B\tan(\alpha))]^2 - \\ 4[1 + (\tan(\alpha))^2][(A - B\tan(\alpha))^2 - dB^2]\end{array}}}{2dB[1 + (\tan(\alpha))^2]}\right\}$$

Alternatively, if there exists an offset distance dBb between the attachment point of the boom block 54 and the tip of the distal end 44 of the boom 40, then with the line segment passing through the point (X1, Y1)=(-B, A) intersecting at point (X2, Y2) an arc of length $dB' = \sqrt{dB^2 + dBb^2}$, the angle θ of the boom 40 in regards to the horizontal plane of the coordinate system of the pipelayer machine 10 is calculable through:

$$\theta = \cos^{-1}\left\{\frac{-[2\tan(\alpha)(A - B\tan(\alpha))] \pm \sqrt[2]{\begin{array}{c}[2\tan(\alpha)(A - B\tan(\alpha))]^2 - \\ 4[1 + (\tan(\alpha))^2][(A - B\tan(\alpha))^2 - dB^2]\end{array}}}{2\sqrt{dB^2 + dBb^2}\,[1 + (\tan(\alpha))^2]}\right\} - \tan^{-1}\left(\frac{dBb}{dB}\right)$$

Figure 7:
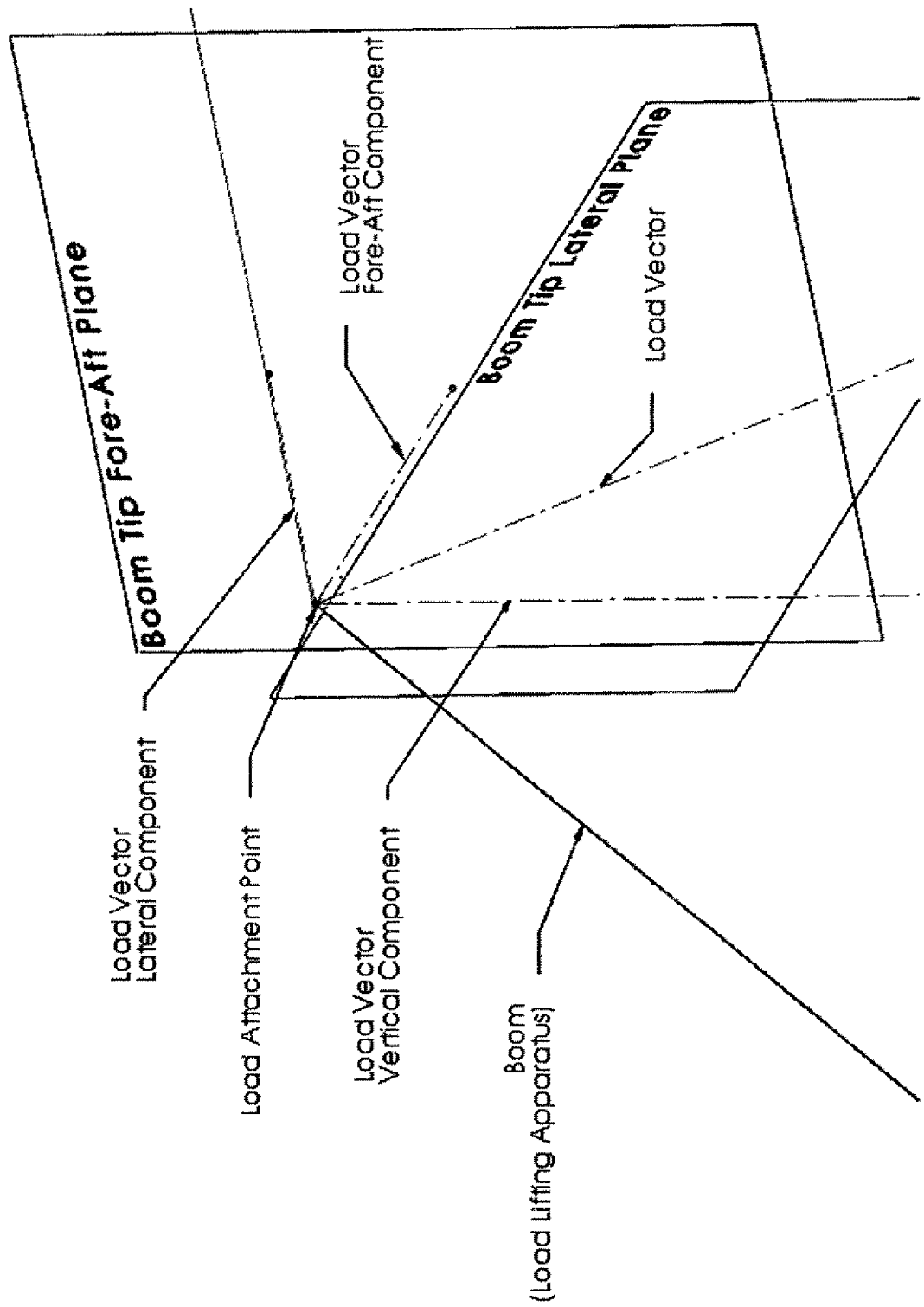
FIG. 7 shows a close up view of the load acting on the end of the boom in FIG. 6.

The position of the distal end 44 of the boom 40 can also be used to in conjunction with a front to back incline of the pipelayer machine 10 determined by the vehicle accelerometer 130 to determine where the distal end 44 of the boom 40 is positioned relative to the ground surface as shown in FIG. 6. If the pipelayer machine 10 is not on level ground, the distal end 44 of the boom 40 will not be positioned directly laterally to the first side 22 of the main body 20 of the pipelayer machine 10, but could be positioned closer to either the front end or rear end of the pipelayer machine 10 than it would be if the pipelayer machine 10 is sitting on level ground, to the point where it may extend past the front or rear tipping fulcrum and begin to create an overturning moment about that fulcrum. The effect of the distal end 44 of the boom 40 being located differently in relation to the ground contact points is a function of the location of the distal end 44 of the boom 40 as determined in step 410 and the gravitational vector as determined from the gravitational vector shown in FIG. 9 acting on the perpendicular component of the distal end 44 of the boom 40 in the vehicle's coordinate system as shown in FIG. 7.

At step 410 for machines such as the telehandler 1000, articulating forklift 1200, rail crane 1300 or similar equipment where sensors can feasibly be mounted directly on the boom, the position of the distal end of the boom can be determined by mathematically solving for it using the known information from the direct sensors. The relative attitude of the boom section(s) may be determined by measuring the length of the cylinder(s) that position the section and/or the angle of each section by placing an accelerometer on each section or joint angle measure at each joint, as applicable. The instantaneous length of any length-variant members such as telescopic booms can be measured by length sensors on the individual length-controlling cylinders or measurements between set locations on each section such as using string-pots or LVDTs or lasers. The geometric location of the distal end of the boom can thus be solved for from the known location of the attachment point at the proximal end of the boom and adding up the individual effect of the length and attitude of the section(s) of the boom.

Referring again to FIG. 16, with the position of the distal end 44 of the boom 40 determined at step 410, the slung load can then be determined at step 412 using the determined position. The slung load will be the weight of the load that is suspended from the vehicle. For example, if the vehicle is a telehandler 1000 the slung load will be a load suspended from the distal end of the boom 104. If the vehicle is a articulating forklift 1200 the load will be carried/suspended by an attachment to the carriage 1246. If the vehicle is the pipelayer machine 10, the slung load will be the weight of the pipe section or other load being lifted by the hook 70 and the boom 40. If the vehicle is a rail crane 1300 the slung load will be carried/suspended by an attachment to the distal end of the boom 1340. If the vehicle is a haul truck 1400 the load will be carried/contained within one or more load containment receptacles such as a dump box 1440 or enclosed container.

In the case of the pipelayer machine 10, the only measured force being the force on the luff block 52 as measured by the load pin 102, this measured force must be used with the different information known and determined about the position of the boom 40 to determine the slung load being placed on the pipelayer machine 10.

Because the boom 40 is typically moving sufficiently slowly as to be considered theoretically mechanically static, i.e. the distal end 44 of the boom 40 is not accelerating upwards or downwards, the torques acting on the boom 40 to keep the boom 40 at a specific angle must equal the torques acting to pivot the boom 40 downwards.

The slung load (i.e. force of the load) can be approximate by calculating for the torques (rotational moments) attempting to rotate the boom 40 about its proximal end 42 pivot point:

$$\Sigma M_{BOOM} = 0 = F_{BC} * D_{BC} + F_{HC} * D_{HC} - F_{Slung} * D_{Load} - F_{BW} * D_{BW}$$

Where $F_{BC}$ is the force applied to the boom 40 by the boom cable 46, $D_{BC}$ is the distance between the luff block 52 pivot point and the proximal end 42 of the boom 40, measured normal to the imaginary line passing between the load pin 102 and the distal end 44 of the boom 40, $F_{HC}$ is the force applied to the boom 40 by the hook cable 72, $D_{HC}$ is the distance between the hook winch 60 and the proximal end 42 of the boom 40, measured normal to the imaginary line passing between the hook winch 60 and distal end 44 of the boom 40, FSlung is the weight of the load, $D_{LOAD}$ is the horizontal distance from where FSlung is acting to the proximal end 42 of the boom 40, $F_{BW}$ is the weight of the boom 40 and $D_{BW}$ is the horizontal distance from the center of gravity of the boom and the proximal end 42 of the boom 40.

Figure 19:
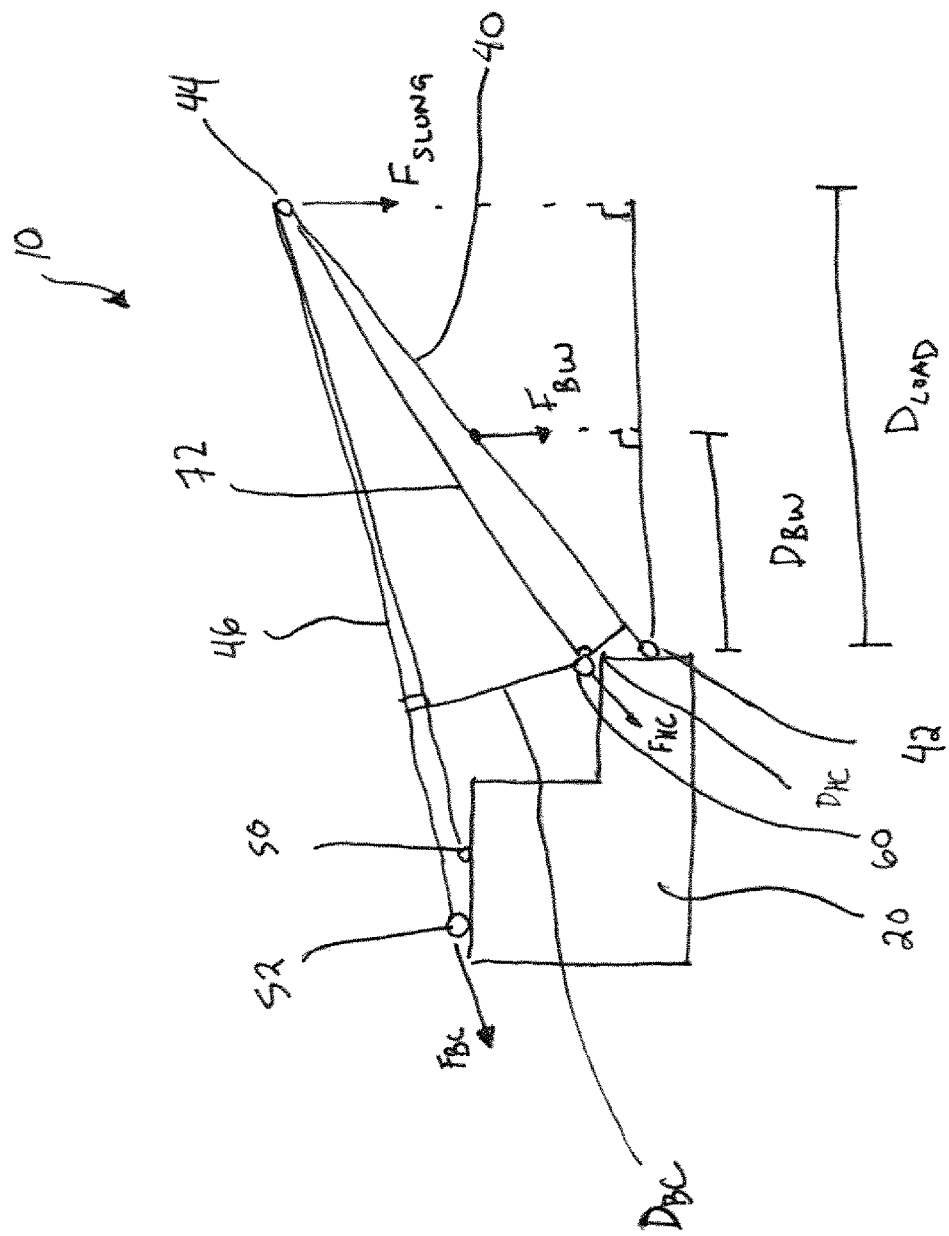
FIG. 19 is a schematic illustration of the forces applied to the distal end of a boom and a pipelayer machine.

FIG. 19 is a schematic illustration of the forces applied to the boom 40 and the pipelayer machine 10. The force applied to the distal end 44 of the boom 40 by the boom cable 46 will act to create a torque on the boom 40 around the proximal end 42 of the boom 40 that is opposite in direction to the torque created on the boom 40 around the proximal end 42 of the boom 40 by the slung load acting on the boom 40 and the weight of the boom 40. Because gravity is creating the force applied by the weight of the load suspended from the boom 40 and the weight of the boom 40, the moments these forces create around the proximal end 42 of the boom 40 will be based on the horizontal distance between proximal end 42 of the boom 40 and a spot vertically below the center of gravity of the load and the center of gravity of the boom 40 where these vertical lines intersect with a horizontal line extending through the proximal end 42 of the boom 40.

Figure 8:
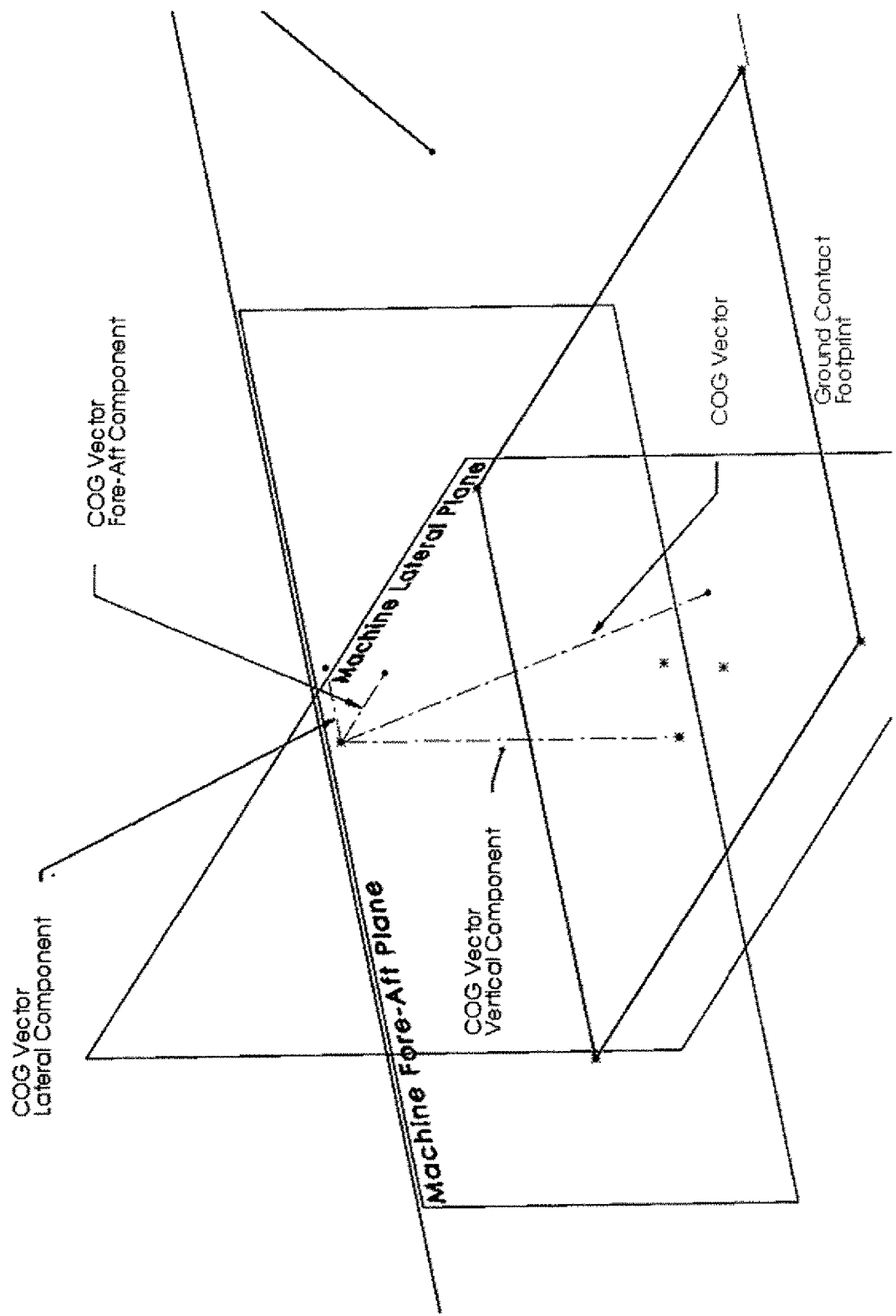
FIG. 8 shows a close up view of the force acting on the center of gravity in FIG. 6.

A three-dimensional Cartesian coordinate system can be created for the vehicle to define a vehicle coordinate system where the ground contact footprint of the vehicle lies in a plane parallel to the horizontal axes of the vehicle coordinate system. When the vehicle is on a level ground surface with gravity acting directly vertically downward on the vehicle and the ground surface defining a plane perpendicular to the direction of gravity, the vertical axis of the vehicle coordinate system will be parallel to the direction of gravity and the slung load and vehicle weight will be acting directly vertically and parallel to the vertical axis of the vehicle coordinate system. However, if the vehicle is on an incline, the load force will not be acting directly vertically with respect to the vehicle coordinate system and will therefore not be in a direction parallel to the vertical axis of the vehicle coordinate system. FIGS. 6 and 9 illustrate the situation where the vehicle is on a ground surface with an incline (or specifically a compound incline). The Cartesian planes of the vehicle coordinate system projected onto the vehicle will intersect at an arbitrary or specifically defined origin point defining the vehicle coordinate system. Within this vehicle coordinate system, rigidly-mounted components are always expressed with a constant location. The slung load (force of the load suspended form the vehicle) can be calculated by determining the portion of the gravitational vector projected into each of the principal planes of the vehicle coordinate system and multiplying by the vector perpendicular to the projected force's line of action. FIG. 6 shows the load vector and the COG vector—each parallel to the gravitational vector—being a compound vector that is not parallel to any of the principal planes in the vehicle coordinate system. Each compound vector must therefore be projected into each principal plane in the vehicle coordinate system as shown in FIGS. 7 and 8. FIG. 7 shows that the resultant vector for the applied load lays outside the principal planes of the vehicle coordinate system projected onto the vehicle. This resultant vector can be resolved into components which are within these normal planes and parallel to the principal axes of the vehicle coordinate system. FIG. 8 shows that the resultant vector for the righting load (machine center of gravity) lays outside the principal planes of the vehicle coordinate system. This resultant vector can be resolved into components which are within these normal planes of the vehicle coordinate system and parallel to the principal axes of the vehicle coordinate system.

In order to resolve the slung load vector and the righting load vector with the vehicle coordinate system projected onto the vehicle, either the resultant vector of the slung load and the resultant vector of the righting load must both be projected into the vehicle coordinate system or the vehicle coordinate system can be rotated into a "global coordinate system".

In a first aspect, the vector for the slung load and the vector for the righting load can be projected into the vehicle coordinate system. For any vector that is not parallel to the principle planes of the vehicle coordinate system, the out of plane compound vector must be projected into each of the principal planes of the vehicle coordinate system. For any vector of length/magnitude V, and with the principal axes of the vehicle coordinate system defined as X being lateral, Y being vertical, Z being fore-aft, the fore-aft angle sensed by the vehicle accelerometer 130 delta ($\delta$), and the lateral angle sensed by the vehicle accelerometer 130 lambda ($\lambda$), the projected force vectors are as follows:

$$V_X = \frac{V \times \tan(\lambda)}{\sqrt{(\tan(\lambda))^2 + 1^2 + (\tan(\delta))^2}} = V \times (-\cos(\delta)\sin\lambda)$$

$$V_Y = \frac{V}{\sqrt{(\tan(\lambda))^2 + 1^2 + (\tan(\delta))^2}} = V \times \cos(\delta)\cos(\lambda)$$

$$V_Z = \frac{V \times \tan(\delta)}{\sqrt{(\tan(\lambda))^2 + 1^2 + (\tan(\delta))^2}} = V \times \sin(\delta)$$

In this manner, the slung load and the righting load are projected into the vehicle coordinate system.

In a second aspect, the vehicle coordinate system can be converted into a new "global coordinate system" or "gravity-normal coordinate system" where the gravitational vector is parallel to the vertical axis of this global coordinate system. In this aspect, the effect of the gravitational vector not being normal to any of the principal axes in the vehicle coordinate system can be accounted for by performing a coordinate system conversion operation that rotates the vehicle coordinate system into a new coordinate system wherein the gravitational vector is parallel with the vertical axis and orthogonal to both the lateral and fore-aft axes of the global coordinate system. With the vehicle coordinate system adjusted in this manner, the tipping effect of the gravitational vector need not be projected into individual components as it lays parallel to the vertical axis of the new global coordinate system.

Figure 20:
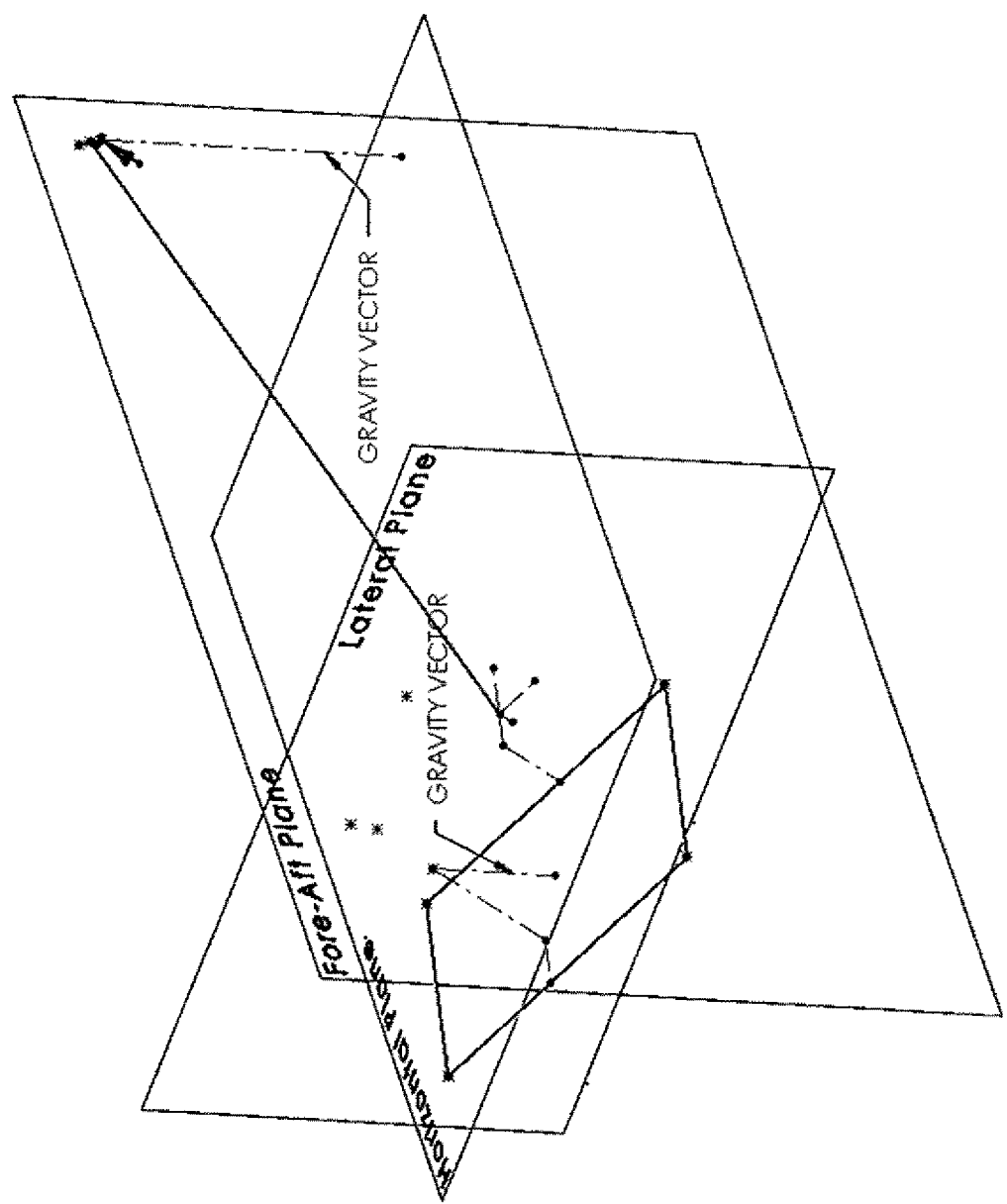
FIG. 20 illustrates a series of vehicle coordinate system points rotated into the global coordinate system for a vehicle located on a compound slope.

FIG. 20 shows a series of vehicle coordinate system points rotated into the global coordinate system; representative of the vehicle being located on a compound slope. This coordinate system shift is accomplished by initially multiplying each vehicle coordinate system point in the vehicle coordinate system by a three-dimensional rotation matrix using the fore-aft angle delta (δ) to rotate it about the lateral X-axis. This shifts it into an intermediate coordinate system, from which it must be transferred into the global coordinate system. This cannot be done directly using the lateral angle lambda (λ), as that angle is between the vehicle coordinate system and the global coordinate system, measured as an angle about the fore-aft Z-axis of the vehicle coordinate system. In the newly-created intermediate coordinate system, this rotation is about an arbitrary axis, as it is not aligned with the principal axes of the intermediate coordinate system. Accordingly, the intermediate coordinate system must subsequently be rotated about an arbitrary axis parallel to the fore-aft Z-axis of the original vehicle coordinate system by the lateral angle lambda (λ).

With the vehicle coordinate system and gravity vector angles as described above, the combination of the steps described above can be understood and formulated as the Euler Angle rotational transformation matrix with a Y-axis rotational angle of zero (0). With the trigonometric terms operative upon the Y-axis rotational angle evaluated with an angle of 0, the terms are evaluated as either a one (1) or a zero (0) and thus the simplified formula respective to global coordinate system coordinates [X", Y", Z"] for any point in the vehicle coordinate system [X, Y, Z] are thus calculable by:

$$\begin{bmatrix} X'' \\ Y'' \\ Z'' \end{bmatrix} = [X \ Y \ Z] \begin{bmatrix} \cos(\lambda) & -\cos(\delta)\sin(\lambda) & \sin(\delta)\sin(\lambda) \\ \sin(\lambda) & \cos(\delta)\cos(\lambda) & -\cos(\lambda)\sin(\delta) \\ 0 & \sin(\delta) & \cos(\delta) \end{bmatrix}$$

Figure 21:
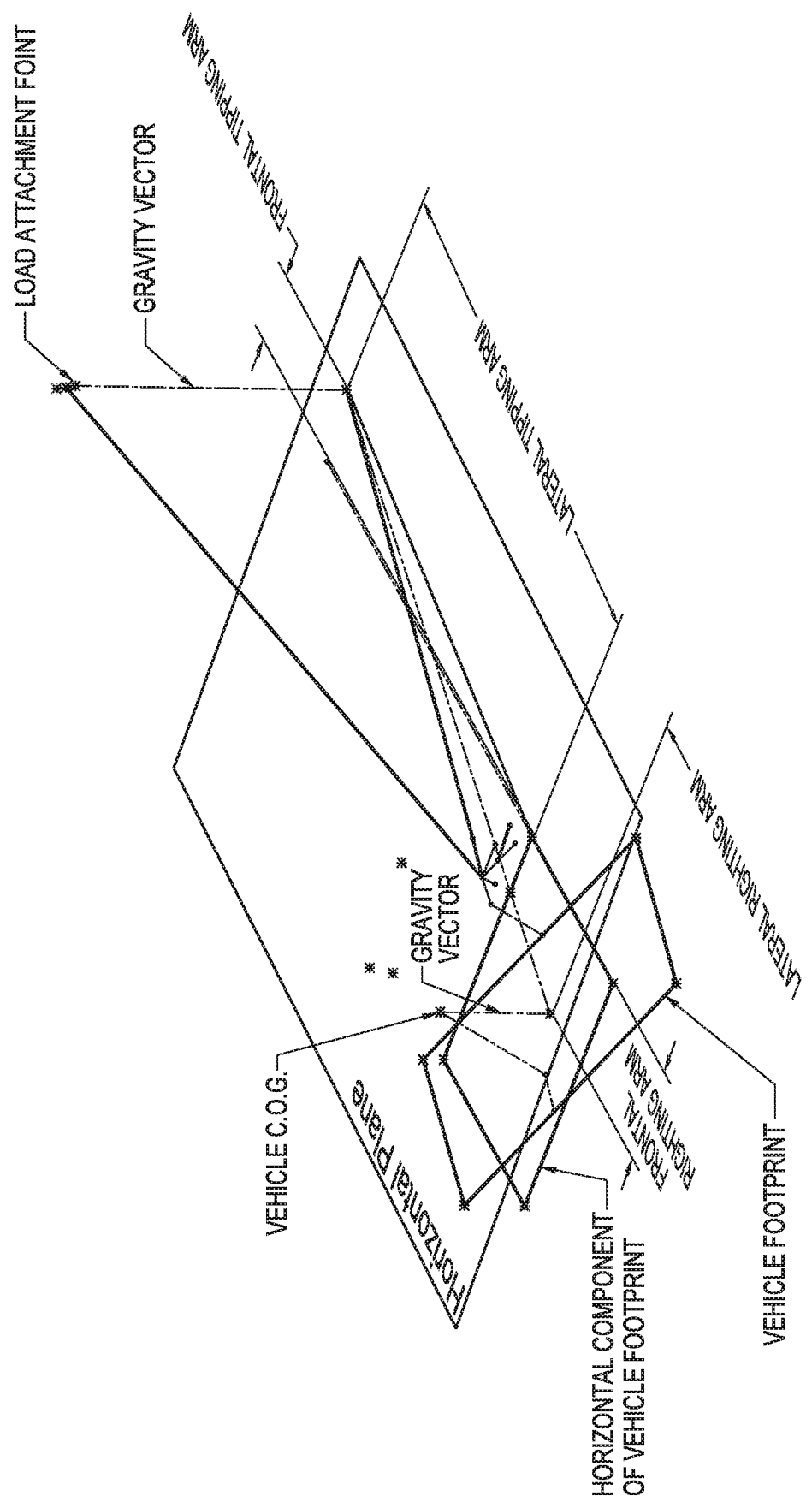
FIG. 21 illustrates the tipping mechanics resulting from transforming the vehicle coordinate system into a gravity-normal global coordinate system.

FIG. 21 shows the simplified tipping mechanics resulting from transforming the vehicle's coordinate system into a gravity-normal coordinate system, wherein the tipping and righting loads are purely vertical and acting upon purely horizontal torque arms.

The force applied by the boom cable 46, will not be caused by gravity, but rather, the tension in the boom cable 46. Therefore, the direction of the force the boom cable 46 is applying to the distal end 44 of the boom 40 will not be vertically downward like the weight of the load and the weight of the boom 40, but instead, will be in the direction of the boom cable 46. Therefore the moment created by the force applied by the boom cable 46 around the proximal end 42 of the boom 44 will be measured normal to the imaginary line passing between where the luff block 52 is pivotally connected to the main body 20 of the pipelayer machine 10 and the distal end 44 of the boom 40 rather than just the horizontal distance between the luff block 42 and the proximal end 42 of the boom 40 like the weight of the load and the weight of the boom 40.

There will also be a torque created on the boom 40 around the proximal end 42 of the boom 40 by the force applied by the hook cable 72 on the distal end 44 of the boom 40. This torque will act in the same direction as the torque created by the boom cable 46 and like the force applied by the boom cable 46 to the distal end 44 of the boom 40, the force of the hook cable 72 is also not caused by gravity, but rather the tension in the hook cable 72. Therefore, the direction of the force the hook cable 72 is applying to the distal end 44 of the boom 40 will not be vertically downward, like the slung load and the weight of the boom 40, but rather, will be in the direction of the hook cable 72. Therefore, the moment created by the force applied by the hook cable 72 around the proximal end 44 of the boom 40 will be measured normal to the imaginary line passing between the hook winch 60 and the distal end 44 of the boom 40 rather than just the horizontal distance between the hook winch 60 and the proximal end 42 of the boom 40 like the weight of the load and the weight of the boom 40.

The equation can be rewritten as follows to solve for the slung load, with all distances and loads having been projected into the vehicle coordinate system and acting perpendicular to the axis of the pivot at the proximal end 42 of the boom 40 so as to affect the propensity of the boom 40 to pivot about the pivot point at the proximal end 42:

$$F_{Slung} = \frac{F_{BC} * D_{BC} + F_{HC} * D_{HC} - F_{BW} * D_{BW}}{D_{Load}}$$

However, the force applied to the distal end 42 of the boom 40 by the boom cable 46 is a function of both the force being measured by the load pin 102 and the force that is applied to the distal end 44 of the boom 40 by the portion of the boom cable 46 that is running between the boom winch 50 and the boom block 54. Therefore, the force applied by this section of the boom cable 46 should also be taken into account in addition to the force that is being measured by the load pin 102, which indicates the tension in the portion of the boom cable 46 that is running between the luff block 52 and the boom block 54. The force applied by the portion of the boom cable 46 running between the boom winch 50 and boom block 54 can be approximated based on the force measured by the load pin 102 because it should depend on the number of times the boom cable 46 runs between the luff block 52 and the boom block 54. This results in the force in the portion of the boom cable 46 being a factor of the force measured by the load pin 102. In one aspect, it may be approximately ¼ of the force measured by the load pin 102 if the boom cable 46 runs between the luff block 52 and the boom block 54 four (4) times after it runs from the boom winch 50 to the boom block 54.

Additionally, some force is applied to the boom 40 by the portion of the hook cable 72 that runs between the hook winch 60 and the load block 74 which should be taken into account in determining the slung load.

By balancing out the moment forces acting on the boom 40, the weight of the load suspended from the boom 40 by the hook 60 can be determined at step 412.

Figure 22:
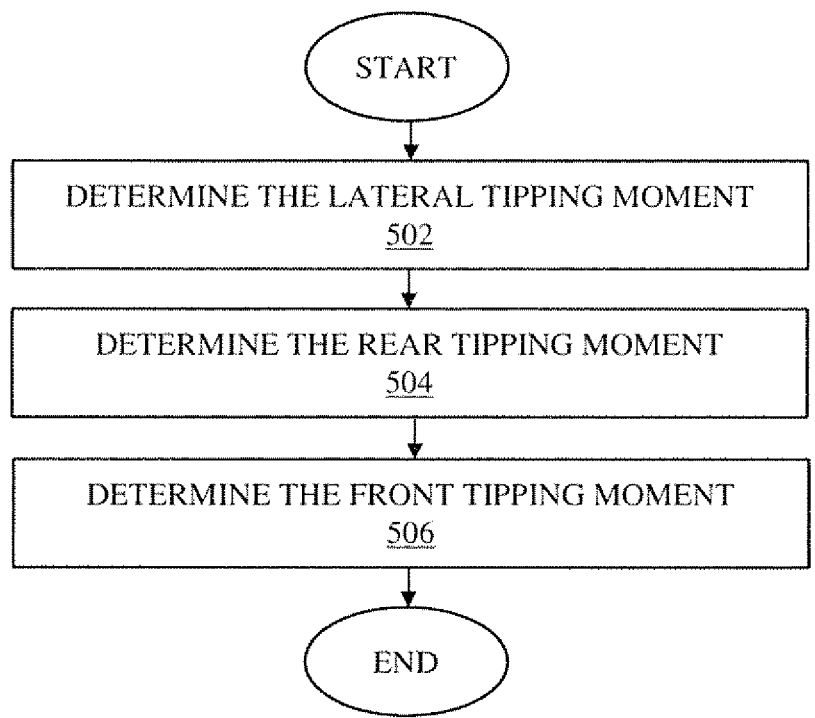
FIG. 22 is a flowchart of a method for determining the tipping moments acting on a pipelayer machine.

With the slung load determined at step 412, the tipping moments acting on the pipelayer machine 10 can be determined at step 414. Referring to FIG. 22, illustrates a flow chart of a method of one method of for determining the tipping moments acting on the pipelayer machine 10 at a specific time for step 414 shown in FIG. 16.

Figure 23:
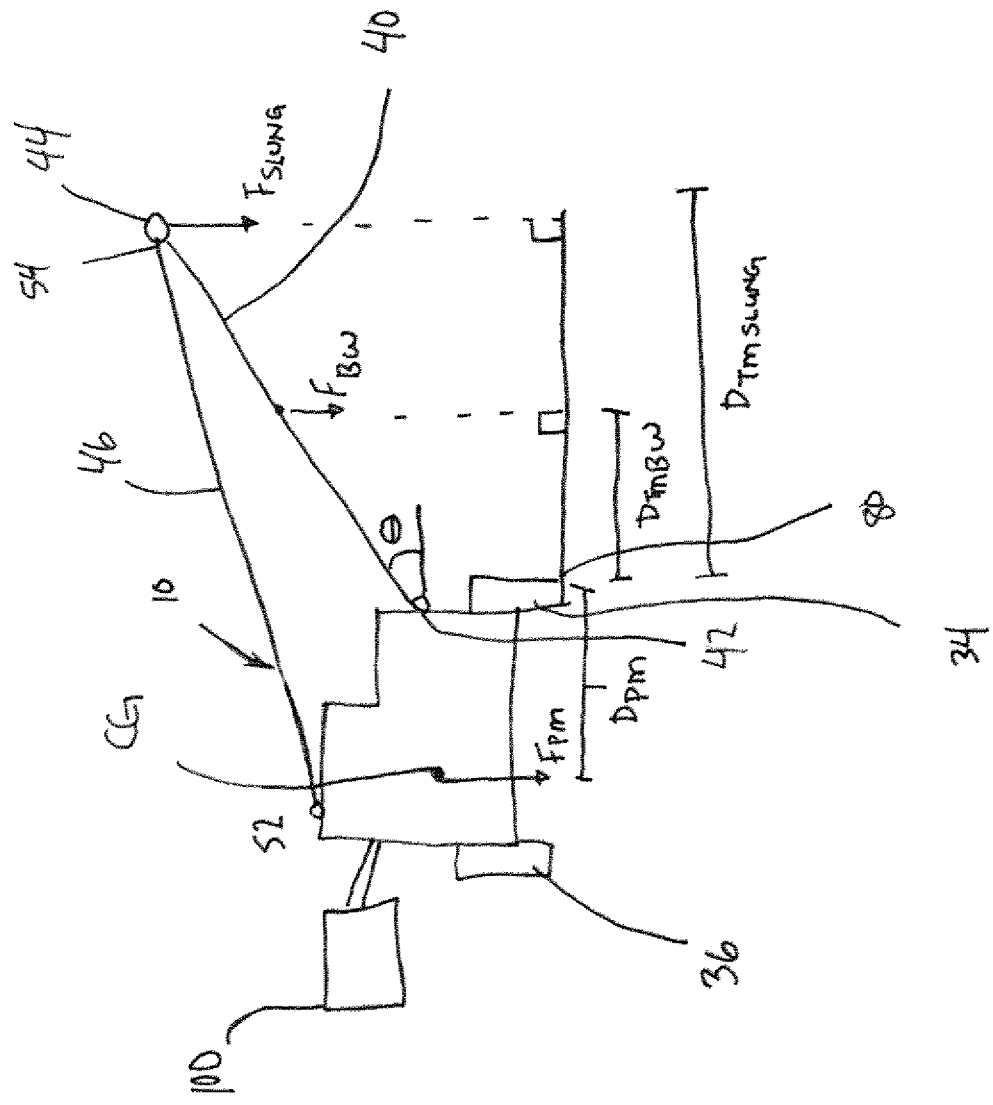
FIG. 23 is a schematic illustration of the forces applied to the pipelifter machine forming the tipping moment and the righting moment.

The method shown in FIG. 21 can start and at step 502 the lateral tipping moment can be determined. FIG. 23 illustrates a force diagram of the forces creating the lateral tipping moment and the lateral righting moment if the vehicle coordinate system has been converted into a new "global coordinate system" where the gravitational vector is parallel to the vertical axis of this global coordinate system. This lateral tipping moment can be determined using the determined slung load suspended from the boom 40 and the horizontal distance the slung load is acting from the tipping fulcrum 80, DTMSlung, in addition to the weight of the boom 40 and the horizontal distance the weight of the boom 40 is acting from the lateral tipping fulcrum 80, $D_{TMBW}$. $D_{TMBW}$ will be the horizontal distance from the center of gravity of the boom 40 to the lateral tipping fulcrum 80.

The lateral tipping fulcrum 80 will typically be the outside edge of the first side track 34 on the first side 22 of the main body 20 of the pipelayer machine 10, because this will be the point that the pipelayer machine 100 will rotate around if the pipelayer machine 10 is to tip as a result of the load lifted by the pipelayer machine 10.

The boom angle, θ, determined for the angle of the boom 40 relative to the ground, the length of the boom 40 and the slope of the ground on which the pipeplayer machine 10 is operating, as measured by the vehicle accelerometer 130, can be used to determine the horizontal distance between where the weight of the load is acting and the proximal end 42 of the boom 40 since this will form a right angle triangle as well as the horizontal distance between horizontal distance between where the weight of the boom 40 is acting and the proximal end 42 of the boom 40. By knowing the horizontal distance between the proximal end 42 of the boom 40 and the lateral tipping fulcrum 80, the horizontal distances between the vertical forces and the lateral tipping fulcrum 80 can be determined.

Alternatively, if the vector for the slung load and the vector for the righting load have been projected into the vehicle coordinate system, the horizontal and vertical distances of the righting and tipping arms within the vehicle's coordinate system are considered and the individual components of the projected out-of-plane compound vectors act upon said torque arms.

With the lateral tipping moment determined at step 502, the method can move onto step 504 and determine the rear tipping moment acting on the pipelayer machine 10. If the vehicle coordinate system has been converted into a global coordinate system where the gravitational vector is parallel to the vertical axis of this global coordinate system, by knowing the location of the proximal end 42 of the boom 40, the slope of the ground on which the pipelayer machine 10 is operating, as measured by the vehicle accelerometer 130, and the horizontal distances between the vertical forces and the rear tipping fulcrum, the rear tipping moment can be determined. The rear tipping fulcrum will typically be the very rear edge of the tracks 34, 36 because this will be the point the pipelayer machine 10 rotates around if it tips backwards.

Alternatively, if the vector for the slung load and the vector for the righting load have been projected into the vehicle coordinate system, the portion of the compound load vector parallel to the gravitational vector projected into the vehicle coordinate system and laying parallel with the vertical axis of the vehicle coordinate system does not contribute to the rear tipping moment unless this point is located behind the rearward tipping fulcrum in the vehicle coordinate system (i.e. the load attachment point does not possess a Z-coordinate value less than that of the rearward tipping fulcrum). If that is the case, only the projected portion of the load vector which is aligned with the vehicle fore-aft Z-axis creates a rearward tipping moment and does so by acting upon the vertical component of the load attachment point location in the vehicle coordinate system. If the load attachment point does extend beyond the rearward tipping fulcrum, then the tipping moment will be created by both the projected portion of the load vector which is aligned with the vehicle fore-aft Z-axis acting upon the vertical component of the load attachment point distance above the ground contact point and by the projected portion of the load vector which is aligned with the vehicle vertical Y-axis acting upon the distance with which fore-aft component of the load attachment point extends beyond the rearward tipping fulcrum in the vehicle coordinate system.

At step 504, the front tipping moment can be determined. Again, if the vehicle coordinate system has been converted into a global coordinate system where the gravitational vector is parallel to the vertical axis of this global coordinate system, by knowing the location of the proximal end 42 of the boom 40 and the slope of the ground on which the pipelayer machine 10 is operating, as measured by the vehicle accelerometer 130, the front tipping moment can be determined using the location where the vertical forces are acting and the front tipping fulcrum. The front tipping fulcrum will typically be the very front edge of the tracks 34, 36 because this will be the point the pipelayer machine 10 rotates around if it tips frontwards.

Alternatively, if the vector for the slung load and the vector for the righting load have been projected into the vehicle coordinate system, the portion of the compound load vector parallel to the gravitational vector projected into the vehicle coordinate system and laying parallel with the vertical axis of the vehicle coordinate system does not contribute to the frontal tipping moment unless this point is located in front of the frontal tipping fulcrum in the vehicle coordinate system (i.e. the load attachment point does not possess a Z-coordinate value greater than that of the frontal tipping fulcrum). If that is the case, only the projected portion of the load vector which is aligned with the vehicle fore-aft Z-axis creates a frontal tipping moment and does so by acting upon the vertical component of the load attachment point location in the vehicle coordinate system. If the load attachment point does extend beyond the frontal tipping fulcrum, then the tipping moment will be created by both the projected portion of the load vector which is aligned with the vehicle fore-aft Z-axis acting upon the vertical component of the load attachment point distance above the ground contact point and by the projected portion of the load vector which is aligned with the vehicle vertical Y-axis acting upon the distance with which fore-aft component of the load attachment point extends beyond the frontal tipping fulcrum in the vehicle coordinate system.

With the lateral, front and rear tipping moments determined, the method shown in FIG. 16 can move on to step 416 and the righting moments can be determined.

Each tipping moment will have an opposite righting moment acting on it. The lateral tipping moment will be counteracted by a lateral righting moment. Referring again to FIG. 23, this lateral righting moment will be the moment acting in the opposite direction of the lateral tipping moment. Where the lateral tipping moment is causing the pipelayer machine 10 to pivot around the fulcrum point 80, the lateral righting moment is acting in the opposite direction and preventing the pipelayer machine 10 from rotating around the lateral tipping fulcrum point 80.

If the vehicle coordinate system has been converted into a global coordinate system where the gravitational vector is parallel to the vertical axis of this global coordinate system, the righting moment can be determined by the weight of the pipelayer machine 10, $F_{PM}$, and the horizontal distance between the center of gravity, CG, of the pipelayer machine 10 to the lateral tipping fulcrum 80, $D_{PM}$, without taking into account the weight of the boom 40 in either the weight used for the pipelayer machine 10 or in determining the center of gravity of the pipelayer machine 10. Extending the counterweight assembly 100 outwards can move the center of gravity of the pipelayer machine 10 further away from the lateral tipping fulcrum 80 thereby increasing the righting moment.

The rear righting moment can be determined using the weight of the pipelayer machine 10, $F_{PM}$, the slope of the ground on which the pipelayer machine 10 is operating, as measured by the vehicle accelerometer 130, and the horizontal distances between the $F_{PM}$ and the rear tipping fulcrum, the rear tipping moment can be determined.

The front righting moment can be determined using the weight of the pipelayer machine 10, $F_{PM}$, the slope of the ground on which the pipelayer machine 10 is operating, as measured by the vehicle accelerometer 130, and the horizontal distances between the $F_{PM}$ and the front tipping fulcrum, the front tipping moment can be determined.

Alternatively, if the vector for the vehicle center of gravity for the righting load has been projected into the vehicle coordinate system, the lateral righting moment will be created by both the projected portion of the righting force vector which is aligned with the vehicle lateral X-axis acting upon the vertical component of the center of gravity distance above the ground contact plane and by the projected portion of the righting force vector which is aligned with the vehicle vertical Y-axis acting upon the distance with which the center of gravity is inset with regards to the lateral tipping fulcrum in the vehicle coordinate system. Depending on the magnitude of the lateral or compound slope the vehicle is operating on, the location of the vehicle center of gravity, and the location of the lateral tipping fulcrum, it is possible for the projected portion of the lateral righting force vector which is aligned with the vehicle lateral X-axis acting upon the vertical component of the center of gravity distance above the ground contact plane to create a negative lateral righting moment which acts to reduce the net lateral righting moment by counteracting a portion of the lateral righting moment generated by the projected portion of the righting force vector which is aligned with the vehicle vertical Y-axis acting upon the distance with which the center of gravity is inset with regards to the lateral tipping fulcrum in the vehicle coordinate system.

If the vector for the vehicle center of gravity for the righting load has been projected into the vehicle coordinate system, the rearward righting moment will be created by both the projected portion of the righting force vector which is aligned with the vehicle fore-aft Z-axis acting upon the vertical component of the center of gravity distance above the ground contact plane and by the projected portion of the righting force vector which is aligned with the vehicle vertical Y-axis acting upon the distance with which the center of gravity is inset with regards to the rearward tipping fulcrum in the vehicle coordinate system. Depending on the magnitude of the uphill or compound slope the vehicle is operating on, the location of the vehicle center of gravity, and the location of the rearward tipping fulcrum, it is possible for the projected portion of the rearward righting force vector which is aligned with the vehicle fore-aft Z-axis acting upon the vertical component of the center of gravity distance above the ground contact plane to create a negative rearward righting moment which acts to reduce the net rearward righting moment by counteracting a portion of the rearward righting moment generated by the projected portion of the righting force vector which is aligned with the vehicle vertical Y-axis acting upon the distance with which the center of gravity is inset with regards to the rearward tipping fulcrum in the vehicle coordinate system.

If the vector for the vehicle center of gravity for the righting load has been projected into the vehicle coordinate system, the frontal righting moment will be created by both the projected portion of the righting force vector which is aligned with the vehicle fore-aft Z-axis acting upon the vertical component of the center of gravity distance above the ground contact plane and by the projected portion of the righting force vector which is aligned with the vehicle vertical Y-axis acting upon the distance with which the center of gravity is inset with regards to the frontal tipping fulcrum in the vehicle coordinate system. Depending on the magnitude of the downhill or compound slope the vehicle is operating on, the location of the vehicle center of gravity, and the location of the frontal tipping fulcrum, it is possible for the projected portion of the frontal righting force vector which is aligned with the vehicle fore-aft Z-axis acting upon the vertical component of the center of gravity distance above the ground contact plane to create a negative righting moment which acts to reduce the net frontal righting moment by counteracting a portion of the frontal righting moment generated by the projected portion of the righting force vector which is aligned with the vehicle vertical Y-axis acting upon the distance with which the center of gravity is inset with regards to the frontal tipping fulcrum in the vehicle coordinate system.

With the tipping moments and the righting moments determined at steps 414 and 416, respectively, the tipping stability or tipping factors can be determined at step 418. These tipping factors can be determined by dividing the tipping moments determined at step 414 by the righting moments determined at step 416 to determine a tipping factor indicating how close the tipping moments are to counteracting righting moments. For example, the lateral tipping stability can be determined by dividing the lateral tipping moment by the lateral righting moment, the rear tipping stability factor can be determined by dividing the rear tipping moment by the rear righting moment and the front tipping stability can be determined by dividing the front tipping moment by the front righting moment. Typically, the lateral tipping factor will be displayed or communicated in some other manner to the operator of the pipelayer machine 10 because this will be the most likely tipping factor to cause concern when the pipelayer machine 10 is in operation. However, if the pipelayer machine 10 is on an sufficiently large incline or decline so that it is significantly tilted frontwards or backwards with the certain combinations of load weight and boom 40 angle, θ, the front tipping factor or the rear tipping factor can be significant to the operator. As the lateral front and rear tipping factors are repeatedly calculated using the method shown in FIG. 4, these tipping factors can be compared to determine which one is the greatest (i.e. in which direction laterally, rearward or forward the pipelayer machine 10 is in danger of tipping) and can choose to display the tipping factor with the greatest value to the operator. Because the lateral tipping stability will typically be the most problematic, this would result in the lateral tipping stability usually being displayed to the operator, unless the pipelayer machine 10 is put on such an incline that either the front tipping stability or the rear tipping stability become larger than the later tipping stability, and this greater tipping stability would then be displayed to the operator. Alternatively, the different tipping stability factors can be displayed simultaneously.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for determining stability of a vehicle having a load suspended from the vehicle, the method comprising:
obtaining measurements from a plurality of sensors positioned on the vehicle;
obtaining a measurement from a vehicle accelerometer operative to determine an inclination of the vehicle;
determining a position of the load suspended from the vehicle;
determining a slung load of the load suspended from the vehicle;
using the determined slung load, the determined position of the load suspended from the vehicle, and the measurement obtained from the vehicle accelerometer, determining tipping moments acting on the vehicle;
determining righting moments acting on the vehicle; and
determining a tipping stability based on the determined tipping moments and determined righting moments,
wherein the vehicle is a pipelayer machine,
and wherein obtaining the measurements from the plurality of sensors positioned on the vehicle comprises:
obtaining a force measurement from a load pin;
obtaining of a position measurement of a luff block using a luff accelerometer positioned on the luff block; and
obtaining a measurement from a boom winch encoder positioned on a boom winch.

2. The method of claim 1 wherein the measurements from the plurality of sensors comprises: position information related to the position of the load suspended from the vehicle; and force information related to the slung load.

3. The method of claim 2 wherein the position information is a measurement of the position of an attachment point of the slung load.

4. The method of claim 2 wherein the force information is a measurement of the slung load.

5. The method of claim 1 wherein the position of the load suspended from the vehicle is a distance from a tipping fulcrum of the vehicle to the load.

6. The method of claim 1 wherein the slung load is determined using the measurement obtained from the vehicle accelerometer.

7. The method of claim 1 wherein the righting moments are determined using the measurement obtained from the vehicle accelerometer.

8. The method of claim 1 wherein the measurement from the vehicle accelerometer is expressed as a gravitational vector indicating a direction of gravity.

9. The method of claim 1 wherein the measurement from the vehicle accelerometer is used to determine an angle between a direction of gravity and a horizontal plane of a vehicle coordinate system based on the vehicle.

10. The method of claim 9 wherein when the direction of gravity is not acting directly vertical to the vehicle, the slung load is determined by determining a portion of the gravitational vector projected into each principal plane of the vehicle coordinate system and multiplying by a vector perpendicular to the slung load.

11. The method of claim 9 wherein a three-dimensional coordinate system is created for the vehicle where a ground contact footprint of the vehicle lies in a plane parallel to a horizontal axis of the vehicle coordinate system.

12. The method of claim 11 wherein a slung load vector and a righting load vector are projected into the vehicle coordinate system.

13. The method of claim 9 wherein the vehicle coordinate system is rotated into a global coordinate system, wherein a direction of gravity is parallel with a vertical axis of the global coordinate system.

14. The method of claim 1 wherein the position of the load suspended from the vehicle is determined using the position information obtained from the sensors and the measurement from the vehicle accelerometer.

15. The method of claim 1 wherein the position of the load suspended from the vehicle is determined using a front-to-back inclination of the vehicle measured by the vehicle accelerometer.

16. The method of claim 1 wherein the position of the load suspended from the vehicle is determined using a side-to-side inclination of the vehicle measured by the vehicle accelerometer.

17. The method of claim 1 wherein the position of the load suspended from the vehicle is determined using combination of a front-to-back inclination of the vehicle measured by the vehicle accelerometer and a side-to-side inclination of the vehicle measured by the vehicle accelerometer.

18. The method of claim 1 wherein determining the tipping moments acting on the vehicle comprises determining lateral tipping moments and determining fore-aft tipping moments.

19. The method of claim 1 further comprising displaying the tipping stability in a cab of the vehicle.

20. The method of claim 1 wherein the tipping stability is a tipping factor and is displayed as a number and 1 indicates the vehicle has reached a tipping point.

21. The method of claim 20 wherein the slung load is determined by calculating torques acting on the boom and summing the torques to zero.

22. The method of claim 1 wherein the tipping stability is a tipping factor and is displayed as a number and 100 indicates the vehicle has reached a tipping point.

23. The method of claim 1 wherein the vehicle is a pipelayer machine.

24. The method of claim 1 wherein the position measurement measured by the luff accelerometer is used to determine an angle of the luff block.

25. The method of claim 24 further comprising altering the angle of the luff block based on the measurement from the boom winch encoder.

26. The method of claim 25 wherein the angle of the luff block is increased if the measurement from the boom winch encoder indicates the boom winch is winding.

27. The method of claim 26 wherein the force measurement is an indication of tension in a boom cable running between the boom winch and a distal end of a boom.

28. The method of claim 25 wherein the angle of the luff block is decreased if the measurement from the boom winch encoder indicates the boom winch is unwinding.

29. The method of claim 24 wherein a position of a distal end of a boom of the pipelayer machine is determined using the angle of the luff block and a length of the boom to determine where the angle of the luff block indicates the distal end of the boom intersects an arc followed by the distal end of the boom as the boom pivots around a proximal end of the boom.

30. The method of claim 29 wherein an angle of inclination of the pipelayer machine is subtracted from the angle of luff block to convert the angle of the luff block to a vehicle coordinate system.

31. The method of claim 30 wherein an angle of the boom is determined using the position of the distal end of the boom and a position of the proximal end of the boom.

32. The method of claim 1 wherein a force measurement is obtained from the load pin and the force measurement is used to determine the slung load.

33. A controller for determining stability of a vehicle having a load suspended from the vehicle, the controller comprising:
at least one processing unit;
an input interface operatively connectable to a plurality of sensors provided on the vehicle and a vehicle accelerometer operative to determine an inclination of the vehicle; and
at least one memory containing program instructions, the at least one processing unit responsive to the program instructions and operative to:
obtain measurements from the plurality of sensors positioned on the vehicle;
obtain a measurement from the vehicle accelerometer operative to determine an inclination of the vehicle;
determine a position of the load suspended from the vehicle;
determine a slung load of the load suspended from the vehicle;
using the determined slung load, the determined position of the load suspended from the vehicle, and the measurement obtained from the vehicle accelerometer, determining tipping moments acting on the vehicle;
determining righting moments acting on the vehicle; and
determining a tipping stability based on the determined tipping moments and determined righting moments,
wherein the vehicle is a pipelayer machine, and wherein obtaining the measurements from the plurality of sensors positioned on the vehicle comprises:
obtaining a force measurement from a load pin;
obtaining of a position measurement of a luff block using a luff accelerometer positioned on the luff block; and
obtaining a measurement from a boom winch encoder positioned on a boom winch.

34. The controller of claim 33 wherein the measurements from the plurality of sensors comprises: position information related to the position of the load suspended from the vehicle; and force information related to the slung load.

35. The controller of claim 34 wherein the position information is a measurement of the position of an attachment point of the slung load.

36. The controller of claim 34 wherein the force information is a measurement of the slung load.

37. The controller of claim 34 wherein the position information is indirectly related to the position of an attachment point on the slung load.

38. The controller of claim 34 wherein the force information is indirectly related to the slung load.

39. The controller of claim 33 wherein the position of the load suspended from the vehicle is a distance from a tipping fulcrum of the vehicle to the load.

40. The controller of claim 33 wherein the slung load is determined using the measurement obtained from the vehicle accelerometer.

41. The controller of claim 33 wherein the righting moments are determined using the measurement obtained from the vehicle accelerometer.

42. The controller of claim 33 wherein the measurement from the vehicle accelerometer is expressed as a gravitational vector indicating a direction of gravity.

43. The controller of claim 42 wherein the measurement from the vehicle accelerometer is used to determine an angle between a direction of gravity and a horizontal plane of a vehicle coordinate system based on the vehicle.

44. The controller of claim 43 wherein when the direction of gravity is not acting directly vertical to the vehicle, the slung load is determined by determining a portion of the gravitational vector projected into principal planes of the vehicle coordinate system and multiplying by a vector perpendicular to the slung load.

45. The controller of claim 43 wherein a three-dimensional coordinate system is created for the vehicle where a ground contact footprint of the vehicle lies in a plane parallel to the horizontal axes of the vehicle coordinate system.

46. The controller of claim 45 wherein a slung load vector and a righting load vector are projected into the vehicle coordinate system.

47. The controller of claim 43 wherein the vehicle coordinate system is rotated into a global coordinate system, wherein a direction of gravity is parallel with a vertical axis of the global coordinate system.

48. The controller of claim 33 wherein the position of the load suspended from the vehicle is determined using the position information obtained from the sensors and the measurement from the vehicle accelerometer.

49. The controller of claim 33 wherein the position of the load suspended from the vehicle is determined using a front-to-back inclination of the vehicle measured by the vehicle accelerometer.

50. The controller of claim 33 wherein the position of the load suspended from the vehicle is determined using a side-to-side inclination of the vehicle measured by the vehicle accelerometer.

51. The controller of claim 33 wherein the position of the load suspended from the vehicle is determined using combination of a front-to-back inclination of the vehicle measured by the vehicle accelerometer and a side-to-side inclination of the vehicle measured by the vehicle accelerometer.

52. The controller of claim 33 wherein determining the tipping moments acting on the vehicle comprises determining lateral tipping moments and determining fore-aft tipping moments.

53. The controller of claim 33 further comprising displaying the tipping stability in a cab of the vehicle.

54. The controller of claim 53 wherein the tipping stability is a tipping factor and is displayed as a number and 1 indicates the vehicle has reached its exact tipping point.

55. The controller of claim 53 wherein the tipping stability is a tipping factor and is displayed as a number and 100 indicates the vehicle has reached its exact tipping point.

56. The controller of claim 33 wherein the vehicle is a pipelayer machine.

57. The controller of claim 56 wherein a force measurement is obtained from a load pin and the force measurement is used to determine the slung load.

58. The controller of claim 57 wherein the force measurement is an indication of tension in a boom cable running between a boom winch and a distal end of a boom.

59. The controller of claim 56 wherein the slung load is determined by calculating torques acting on the boom and summing the torques to zero.

60. The controller of claim 33 wherein the position measurement measured by the luff accelerometer is used to determine an angle of the luff block.

61. The controller of claim 60 further comprising altering the angle of the luff block based on the measurement from the boom winch encoder.

62. The controller of claim 61 wherein the angle of the luff block is increased if the measurement from the boom winch encoder indicates the boom winch is winding.

63. The controller of claim 61 wherein the angle of the luff block is decreased if the measurement from the boom winch encoder indicates the boom winch is unwinding.

64. The controller of claim 60 wherein a position of a distal end of a boom of the pipelayer machine is determined using the angle of the angle of the luff block and a length of a boom to determine where the angle of the luff block indicates the distal end of the boom intersects an arc followed by the distal end of boom as it pivots around a proximal end of the boom.

65. The controller of claim 64 wherein an angle of inclination of the pipelayer machine is subtracted from the angle of luff block to convert the angle of the luff block to a vehicle coordinate system.

66. The controller of claim 65 wherein an angle of the boom is determined using the position of the distal end of the boom and a position of the proximal end of the boom.

\* \* \* \* \*